United States Patent
Zhou et al.

(10) Patent No.: US 12,155,486 B2
(45) Date of Patent: Nov. 26, 2024

(54) ADAPTIVE RATELESS CODING FOR SIDELINK COMMUNICATIONS

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 17/513,846

(22) Filed: Oct. 28, 2021

(65) Prior Publication Data

US 2023/0139023 A1    May 4, 2023

(51) Int. Cl.
*H04W 72/04* (2023.01)
*H04L 1/1812* (2023.01)
*H04W 72/20* (2023.01)

(52) U.S. Cl.
CPC ........... *H04L 1/1819* (2013.01); *H04W 72/20* (2023.01)

(58) Field of Classification Search
CPC ... H04L 1/1819; H04L 1/0009; H04L 1/0056; H04L 1/1671; H04L 1/1825; H04W 72/20; H04W 72/25; H04W 92/18
See application file for complete search history.

(56) References Cited

U.S. PATENT DOCUMENTS

| | | | |
|---|---|---|---|
| 2008/0313520 A1* | 12/2008 | Suneya | H04L 1/1825 714/748 |
| 2016/0205586 A1* | 7/2016 | Kim | H04L 1/1835 370/230 |
| 2018/0234116 A1* | 8/2018 | Shi | H04N 7/24 |
| 2019/0342910 A1* | 11/2019 | Cao | H04L 5/0091 |
| 2020/0275425 A1* | 8/2020 | Cao | H04L 1/0003 |
| 2020/0337021 A1* | 10/2020 | Zhang | H04L 1/08 |
| 2021/0160014 A1* | 5/2021 | Selvanesan | H04W 76/27 |
| 2021/0337509 A1* | 10/2021 | Selvanesan | H04W 72/0446 |
| 2022/0021483 A1* | 1/2022 | Cao | H04L 1/0057 |
| 2023/0209508 A1* | 6/2023 | Liu | H04W 72/0453 370/329 |

* cited by examiner

*Primary Examiner* — Mahbubul Bar Chowdhury
(74) *Attorney, Agent, or Firm* — Holland & Hart LLP/Qualcomm Incorporated

(57) ABSTRACT

Methods, systems, and devices for wireless communications are described. A first user equipment (UE) may receive and decode a network-coded message over a sidelink channel from a second UE, the network-coded message encoded using a rateless encoding algorithm. The first UE may report redundancy feedback information to the second UE for the network-coded message. Based on the feedback information, the second UE may adjust an amount of redundancy used to encode future messages to the first UE that are encoded using the rateless encoding algorithm.

30 Claims, 19 Drawing Sheets

ADAPTIVE RATELESS CODING FOR SIDELINK COMMUNICATIONS

FIELD OF TECHNOLOGY

The following relates to wireless communications, including adaptive rateless coding for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support adaptive rateless coding for sidelink communications. Generally, a first user equipment (UE) that receives and decodes a network-coded packet (e.g., a packet encoded using a rateless encoding algorithm) over a sidelink channel from a second UE (e.g., a transmitting UE) may report redundancy feedback information to the transmitting UE for the network-coded packet. The transmitting UE may adjust the amount of redundancy for the rateless encoding for future packets transmitted to the first UE (the receiving UE) based on the reported redundancy feedback information. An original set of parameters for network coding on the sidelink, including, for example, a first amount of redundancy, a quantity of subpackets into which to divide each packet, a rateless encoding algorithm, and a rateless decoding algorithm, may be transmitted by a base station to the transmitting UE and the receiving UE via control signaling. The transmitting UE may encode and transmit a first packet according to the first set of parameters, and the receiving UE may decode the first packet according to the first set of parameters. The receiving UE may report network coding redundancy feedback information to the transmitting UE based on the decoding. The transmitting UE may encode a second packet using the rateless encoding algorithm and in accordance with a second amount of redundancy based on the network coding redundancy feedback information, and the transmitting UE may transmit the second encoded packet to the receiving UE.

A method for wireless communications at a first user UE is described. The method may include receiving, from a base station, signaling that indicates a first amount of redundancy for encoding using a rateless encoding algorithm, encoding a first packet using the rateless encoding algorithm and in accordance with the first amount of redundancy to obtain an encoded first packet, transmitting the encoded first packet to a second UE via a sidelink channel, receiving, from the second UE, a message including information that indicates a sufficiency of the first amount of redundancy for encoding using the rateless encoding algorithm, encoding a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm, and transmitting the encoded second packet to the second UE via the sidelink channel.

An apparatus for wireless communications at a first UE is described. The apparatus may include a memory, a transceiver, and at least one processor in communication with the memory and the transceiver. The at least one processor may be configured to cause the apparatus to receive, from a base station, signaling that indicates a first amount of redundancy for encoding using a rateless encoding algorithm, encode a first packet using the rateless encoding algorithm and in accordance with the first amount of redundancy to obtain an encoded first packet, transmit the encoded first packet to a second UE via a sidelink channel, receive, from the second UE, a message including information that indicates a sufficiency of the first amount of redundancy for encoding using the rateless encoding algorithm, encode a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm, and transmit the encoded second packet to the second UE via the sidelink channel.

Another apparatus for wireless communications at a first UE is described. The apparatus may include means for receiving, from a base station, signaling that indicates a first amount of redundancy for encoding using a rateless encoding algorithm, means for encoding a first packet using the rateless encoding algorithm and in accordance with the first amount of redundancy to obtain an encoded first packet, means for transmitting the encoded first packet to a second UE via a sidelink channel, means for receiving, from the second UE, a message including information that indicates a sufficiency of the first amount of redundancy for encoding using the rateless encoding algorithm, means for encoding a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm, and means for transmitting the encoded second packet to the second UE via the sidelink channel.

A non-transitory computer-readable medium storing code for wireless communications at a first UE is described. The code may include instructions executable by a processor to receive, from a base station, signaling that indicates a first amount of redundancy for encoding using a rateless encoding algorithm, encode a first packet using the rateless encoding algorithm and in accordance with the first amount of redundancy to obtain an encoded first packet, transmit the encoded first packet to a second UE via a sidelink channel, receive, from the second UE, a message including information that indicates a sufficiency of the first amount of redundancy for encoding using the rateless encoding algorithm, encode a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm, and transmit the encoded second packet to the second UE via the sidelink channel.

In some examples of the method, apparatuses, and non-transitory computer-readable medium described herein, the information that indicates the sufficiency of the first amount of redundancy may be packet-level information that indicates the sufficiency of the first amount of redundancy.

In some examples of the method, apparatuses, and non-transitory computer-readable medium described herein, the information that indicates the sufficiency of the first amount of redundancy indicates an estimated loss probability for the first packet, and the method, apparatuses, and non-transitory computer-readable medium may include further operations, features, means, or instructions for determining the second amount of redundancy based on the estimated loss probability.

In some examples of the method, apparatuses, and non-transitory computer-readable medium described herein, determining the second amount of redundancy based on the estimated loss probability may include operations, features, means, or instructions for identifying the second amount of redundancy based on an index value for a lookup table, where the index value for the lookup table corresponds to the estimated loss probability.

In some examples of the method, apparatuses, and non-transitory computer-readable medium described herein, receiving the message including the information that indicates the sufficiency of the first amount of redundancy may include operations, features, means, or instructions for receiving, in the message, an indication of the second amount of redundancy.

In some examples of the method, apparatuses, and non-transitory computer-readable medium described herein, receiving the message including the information that indicates the sufficiency of the first amount of redundancy may include operations, features, means, or instructions for receiving, in the message, a request to decrease a redundancy amount for encoding using the rateless encoding algorithm, where the second amount of redundancy may be less than the first amount of redundancy.

In some examples of the method, apparatuses, and non-transitory computer-readable medium described herein, receiving the message including the information that indicates the sufficiency of the first amount of redundancy may include operations, features, means, or instructions for receiving, in the message, a request to increase a redundancy amount for encoding using the rateless encoding algorithm, where the second amount of redundancy may be greater than the first amount of redundancy.

In some examples of the method, apparatuses, and non-transitory computer-readable medium described herein, receiving the message including the information that indicates the sufficiency of the first amount of redundancy may include operations, features, means, or instructions for receiving, in the message, an indication of whether the first packet was successfully decoded, where the second amount of redundancy may be based on the indication.

In some examples of the method, apparatuses, and non-transitory computer-readable medium described herein, encoding the first packet using the rateless encoding algorithm may include operations, features, means, or instructions for dividing the first packet into a set of subpackets including a first quantity of subpackets and generating a set of encoded subpackets based on the set of subpackets and using the rateless encoding algorithm, where the set of encoded subpackets includes a second quantity of encoded subpackets that may be greater than the first quantity of subpackets, and where an amount of redundancy for encoding using the rateless encoding algorithm includes a difference between the second quantity of encoded subpackets and the first quantity of subpackets.

Some examples of the method, apparatuses, and non-transitory computer-readable medium described herein may further include operations, features, means, or instructions for receiving, from the second UE, a second message including information that indicates a second sufficiency of the second amount of redundancy for encoding using the rateless encoding algorithm, transmitting, to the base station and based on the information that indicates the second sufficiency of the second amount of redundancy for encoding using the rateless encoding algorithm, a request to switch from using the rateless encoding algorithm to using a different rateless encoding algorithm for sidelink communications, receiving, from the base station, an indication of a second rateless encoding algorithm that includes the different rateless encoding algorithm, encoding a third packet using the second rateless encoding algorithm to obtain an encoded third packet, and transmitting the encoded third packet to the second UE via the sidelink channel.

In some examples of the method, apparatuses, and non-transitory computer-readable medium described herein, the information that indicates the second sufficiency of the second amount of redundancy may be packet-level information that indicates the second sufficiency of the second amount of redundancy.

Some examples of the method, apparatuses, and non-transitory computer-readable medium described herein may further include operations, features, means, or instructions for receiving an indication of a quantity of subpackets into which to divide each packet for encoding using the rateless encoding algorithm, an indication of the rateless encoding algorithm, an indication of a rateless decoding algorithm, an indication of a pool of transmission resources for sidelink communications by the first UE, or any combination thereof.

A method for wireless communications at a second UE is described. The method may include receiving, from a base station, signaling that indicates a first amount of redundancy for encoding using a rateless encoding algorithm, receiving, from a first UE via a sidelink channel, a packet encoded using the rateless encoding algorithm and in accordance with the first amount of redundancy, decoding the packet using a rateless decoding algorithm that corresponds to the rateless encoding algorithm, and transmitting, to the first UE based on decoding the packet using the rateless decoding algorithm, a message including information that indicates a sufficiency of the first amount of redundancy for encoding using the rateless encoding algorithm.

An apparatus for wireless communications at a second UE is described. The apparatus may include a memory, a transceiver, and at least one processor in communication with the memory and the transceiver. The at least one processor may be configured to cause the apparatus to receive, from a base station, signaling that indicates a first amount of redundancy for encoding using a rateless encoding algorithm, receive, from a first UE via a sidelink channel, a packet encoded using the rateless encoding algorithm and in accordance with the first amount of redundancy, decode the packet using a rateless decoding algorithm that corresponds to the rateless encoding algorithm, and transmit, to the first UE based on decoding the packet using the rateless decoding algorithm, a message including information that indicates a sufficiency of the first amount of redundancy for encoding using the rateless encoding algorithm.

Another apparatus for wireless communications at a second UE is described. The apparatus may include means for receiving, from a base station, signaling that indicates a first amount of redundancy for encoding using a rateless encoding algorithm, means for receiving, from a first UE via a sidelink channel, a packet encoded using the rateless encoding algorithm and in accordance with the first amount of redundancy, means for decoding the packet using a rateless decoding algorithm that corresponds to the rateless encoding algorithm, and means for transmitting, to the first UE based on decoding the packet using the rateless decoding algorithm, a message including information that indicates a sufficiency of the first amount of redundancy for encoding using the rateless encoding algorithm.

A non-transitory computer-readable medium storing code for wireless communications at a second UE is described. The code may include instructions executable by a processor to receive, from a base station, signaling that indicates a first amount of redundancy for encoding using a rateless encoding algorithm, receive, from a first UE via a sidelink channel, a packet encoded using the rateless encoding algorithm and in accordance with the first amount of redundancy, decode the packet using a rateless decoding algorithm that corresponds to the rateless encoding algorithm, and transmit, to the first UE based on decoding the packet using the rateless decoding algorithm, a message including information that indicates a sufficiency of the first amount of redundancy for encoding using the rateless encoding algorithm.

In some examples of the method, apparatuses, and non-transitory computer-readable medium described herein, the information that indicates the sufficiency of the first amount of redundancy may be packet-level information that indicates the sufficiency of the first amount of redundancy.

Some examples of the method, apparatuses, and non-transitory computer-readable medium described herein may further include operations, features, means, or instructions for estimating a loss probability for the packet, where the information that indicates the sufficiency of the first amount of redundancy for encoding using the rateless encoding algorithm indicates the estimated loss probability for the packet.

In some examples of the method, apparatuses, and non-transitory computer-readable medium described herein, estimating the loss probability for the packet may include operations, features, means, or instructions for determining a first quantity of subpackets received by the second UE during a time period and a second quantity of subpackets transmitted by the first UE during the time period, the loss probability based on a ratio between the first quantity of subpackets received by the second UE and the second quantity of subpackets transmitted by the first UE during the time period.

Some examples of the method, apparatuses, and non-transitory computer-readable medium described herein may further include operations, features, means, or instructions for estimating a loss probability for the packet and determining a second amount of redundancy based on the estimated loss probability for the packet, where the information that indicates the sufficiency of the first amount of redundancy for encoding using the rateless encoding algorithm indicates the second amount of redundancy.

In some examples of the method, apparatuses, and non-transitory computer-readable medium described herein, determining the second amount of redundancy based on the estimated loss probability may include operations, features, means, or instructions for identifying the second amount of redundancy based on an index value for a lookup table, where the index value for the lookup table corresponds to the estimated loss probability.

In some examples of the method, apparatuses, and non-transitory computer-readable medium described herein, transmitting the message including the information that indicates the sufficiency of the first amount of redundancy may include operations, features, means, or instructions for transmitting, in the message, a request to increase a redundancy amount.

In some examples of the method, apparatuses, and non-transitory computer-readable medium described herein, transmitting the message including the information that indicates the sufficiency of the first amount of redundancy may include operations, features, means, or instructions for transmitting, in the message, a request to decrease a redundancy amount.

In some examples of the method, apparatuses, and non-transitory computer-readable medium described herein, transmitting the message including the information that indicates the sufficiency of the first amount of redundancy may include operations, features, means, or instructions for transmitting, in the message, an indication of whether the packet was successfully decoded.

In some examples of the method, apparatuses, and non-transitory computer-readable medium described herein, decoding the packet using the rateless decoding algorithm may include operations, features, means, or instructions for identifying a set of encoded subpackets received for the packet, the set of encoded subpackets including a first quantity of encoded subpackets greater than or equal to a second quantity of original subpackets encoded using the rateless encoding algorithm, decoding the set of encoded subpackets to obtain a set of decoded subpackets including a third quantity of decoded subpackets, the third quantity greater than or equal to the second quantity, and attempting to obtain the packet based on the set of decoded subpackets.

In some examples of the method, apparatuses, and non-transitory computer-readable medium described herein, a probability of success for decoding the packet using the rateless decoding algorithm may be based on a difference between the first quantity of encoded subpackets and the second quantity of original subpackets.

Some examples of the method, apparatuses, and non-transitory computer-readable medium described herein may further include operations, features, means, or instructions for transmitting, to the base station, a request to transmit the information that indicates the sufficiency of the first amount of redundancy for encoding using the rateless encoding algorithm and receiving, from the base station, a grant in response to the request, where the message including the information that indicates the sufficiency of the first amount of redundancy for encoding using the rateless encoding algorithm may be transmitted based on the grant from the base station.

Some examples of the method, apparatuses, and non-transitory computer-readable medium described herein may further include operations, features, means, or instructions for transmitting the request to transmit the information that indicates the sufficiency of the first amount of redundancy for encoding using the rateless encoding algorithm may be based on one of a condition of the sidelink channel or a quality of service target associated with the sidelink channel.

Some examples of the method, apparatuses, and non-transitory computer-readable medium described herein may further include operations, features, means, or instructions for receiving, from the base station, a request to transmit the information that indicates the sufficiency of the first amount of redundancy for encoding using the rateless encoding algorithm, where transmitting the message including the information that indicates the sufficiency of the first amount of redundancy for encoding using the rateless encoding algorithm may be transmitted based on the request from the base station.

Some examples of the method, apparatuses, and non-transitory computer-readable medium described herein may further include operations, features, means, or instructions for receiving, from the first UE via the sidelink channel, a second packet encoded using the rateless encoding algorithm and in accordance with a second amount of redundancy different than the first amount of redundancy, the second amount of redundancy different than the first amount of redundancy and based on the sufficiency of the first amount of redundancy for encoding using the rateless encoding algorithm.

Some examples of the method, apparatuses, and non-transitory computer-readable medium described herein may further include operations, features, means, or instructions for receiving an indication of a quantity of original subpackets for the packet encoded using the rateless encoding algorithm, an indication of the rateless encoding algorithm, an indication of the rateless decoding algorithm, an indication of a pool of transmission resources for sidelink communications by the second UE, or any combination thereof.

DETAILED DESCRIPTION

Figure 1:
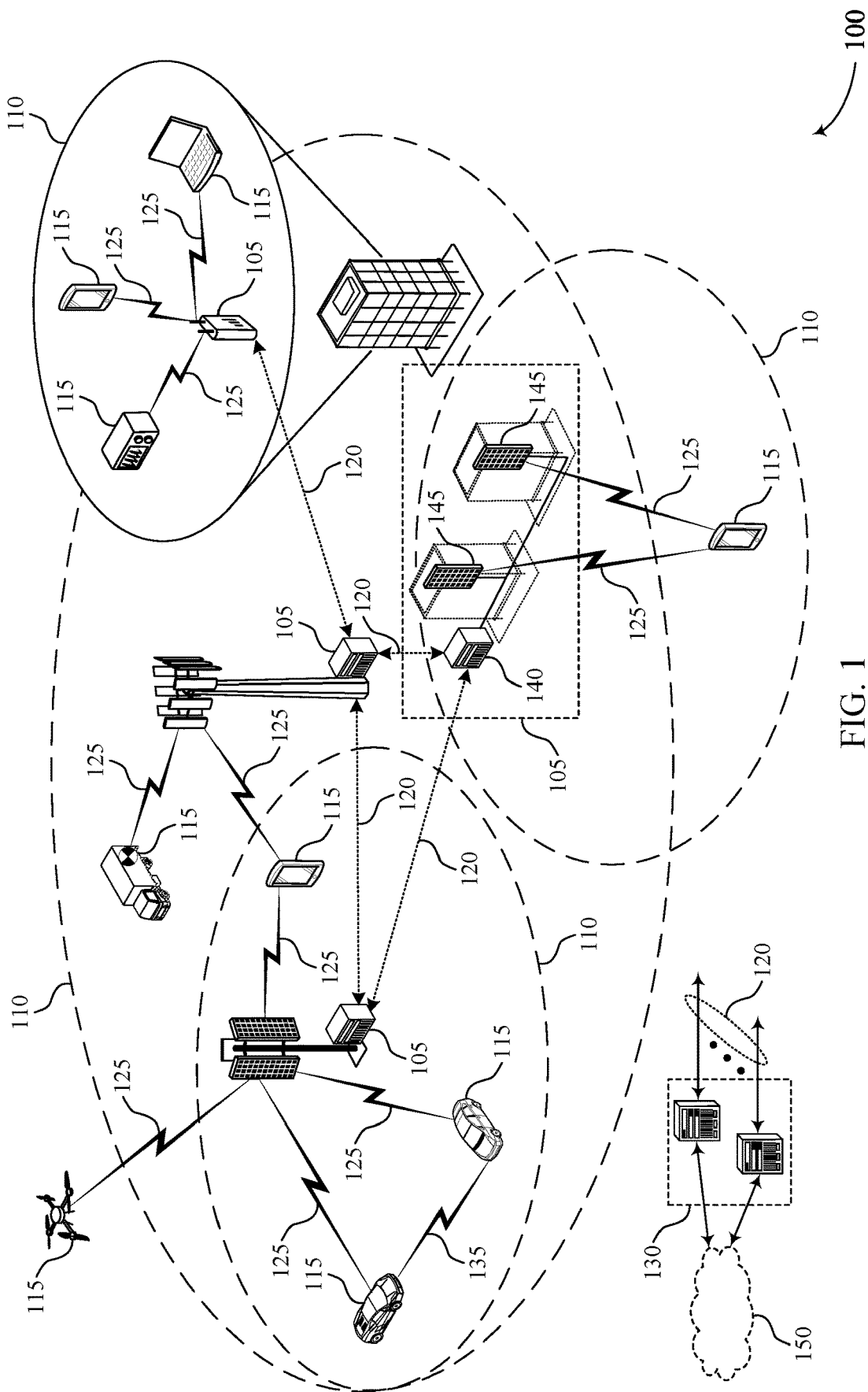
FIG. 1 illustrates an example of a wireless communications system that supports adaptive rateless coding for sidelink communications in accordance with aspects of the present disclosure.

In some wireless communications systems, a user equipment (UE) may communicate with one or more other UEs via sidelink connections. Some examples of sidelink communications may be device-to-device (D2D) communications, vehicle-to-vehicle (V2V) communications, vehicle-to-everything (V2X), etc. In some examples, a UE may use a sidelink connection with a neighboring UE to obtain or relay missed information from a previous downlink transmission. Some wireless communications systems may use network coding schemes (e.g., coding schemes using a rateless encoding algorithm) to improve reliability of transmissions. For example, a transmitter (e.g., a transmitting UE or a base station) may divide an original packet into k original subpackets and encode and transmit N subpackets to reliably send the k original subpackets of the packet to a receiving UE, where N>k. The difference between N and k may correspond to an amount of redundancy of the network coding scheme. A receiver (e.g., a receiving UE) may receive and decode at least a number (e.g., M) of subpackets to recover the original packet with a desired probability (e.g., 99%), where M is less than N, but greater than k.

The amount of subpackets M to be received to decode the k subpackets with the desired probability may be dependent upon channel conditions between the transmitter and receiver. Network coding may be used on a direct link between a base station and one or more UEs or on sidelinks between multiple UEs. In some examples, for UEs communicating with a given base station, the decodable set size M is fixed for a fixed number of subpackets k in order to achieve a desired decoding success probability based on channel conditions of the direct link. Channel conditions on the sidelinks between the UEs may be different from the channel conditions of the direct link, however. Therefore, if an amount of redundancy for all receiving devices is identical (e.g., inflexible), then some resources may be utilized inefficiently and some transmissions may be more likely to fail.

For example, a transmitting base station in communication with two receiving UEs may communicate via direct communication links having a low path loss. Additionally or alternatively, a transmitting UE may communicate with a receiving UE via a sidelink having a high path loss. If the transmitting UE encodes and transmits signaling on the sidelink using the same redundancy configuration (e.g., network coding with a same N value for a set quantity of subpackets k) as the base station on the direct link, then transmission on the sidelink may not be successfully received (e.g., because the redundancy configuration of the network encoding on the sidelink is not high enough to compensate for the high packet loss). Or if the sidelink has a lower path loss than the direct link, transmissions on the sidelink may unnecessarily utilize more resources than necessary (e.g., introducing more redundancy than necessary and utilizing extra resources that may have otherwise been available for use for other communications). Thus, a fixed network coding redundancy for a sidelink configuration may result in inefficient use of available resources, failed transmissions, increased system latency, decreased reliability of communications, and decreased user experience.

A UE receiving messages (the receiving UE) via a sidelink channel from another UE (the transmitting UE) may report redundancy feedback information to the transmitting UE, and the transmitting UE may adjust the amount of redundancy for the network coding for future messaging based on the reported redundancy feedback information. In some cases, the reported redundancy feedback information may be packet-level information, where packet-level information may refer to information that is associated with an entire packet (e.g., obtained by the receiving UE based on attempting to decode one or more entire packets as transmitted by the transmitting UE).

An original set of parameters for network coding on the sidelink may be received by the transmitting UE and the receiving UE from the base station via control signaling. The original set of parameters for network coding on the sidelink may include, for example, a first amount of redundancy, a quantity of subpackets into which to divide each packet, a rateless encoding algorithm, and a corresponding rateless decoding algorithm. The transmitting UE may encode and transmit a first packet according to the first set of parameters, and the receiving UE may decode the first packet according to the first set of parameters. The receiving UE may report the network coding redundancy feedback information (e.g., packet-level redundancy feedback information) to the transmitting UE based on the decoding.

For example, the receiving UE may transmit, to the transmitting UE, redundancy feedback information that may include an estimated packet loss probability calculated by the receiving UE (e.g., based on attempting to decode one or more entire packets). The loss probability (p_loss) may be estimated as the number of received subpackets divided by the total amount of subpackets transmitted over a given period of time T (e.g., where the total amount of transmitted subpackets of the period T correspond to one or more entire packets). The transmitting UE may adjust the amount of redundancy based on the reported loss probability. In some cases, the receiving UE may transmit, to the transmitting UE, redundancy feedback information that may include a requested amount of redundancy (e.g., based on attempting to decode one or more entire packets). For example, the receiving UE may calculate the desired amount of redundancy R as R=M/(1−p_loss)−k. The receiving UE may indicate the desired amount of redundancy to the transmitting UE. In some cases, the receiving UE may transmit, to the transmitting UE, redundancy feedback information that may include a request to increase or decrease the amount of redundancy by a given amount, for example based on whether the receiving UE successfully decoded one or more packets. In some cases, the receiving UE may transmit, to the transmitting UE, redundancy feedback information that may include a determination that decoding was successful or unsuccessful for one or more packets. The transmitting UE may increase or decrease the amount of redundancy based on whether the one or more packets were successfully decoded.

In some cases, if the receiving UE continues to fail to decode packets transmitted over the sidelink after redundancy amount updates by the transmitting UE, the transmitting UE may request updated network coding algorithms and associated parameters from the base station. For example, if the receiving UE indicates a threshold number of times that an amount of redundancy should be increased or that multiple subsequent packets were unsuccessfully decoded, the transmitting UE may request updated network coding algorithms and associated parameters from the base station. In response, the base station may transmit updated network coding algorithms and associated parameters to the transmitting UE and the receiving UE. In some examples, the transmitting UE may request updated network coding algorithms and associated parameters from the base station based on changing sidelink channel conditions or based on changing sidelink quality of service targets.

In some examples, the base station may activate or deactivate (e.g., via a medium access control (MAC) control element (MAC-CE) signal or a downlink control information (DCI) message) the ability of the receiving UE to report redundancy feedback information to the transmitting UE, for example based on sidelink channel conditions or sidelink quality of service targets. The receiving UE may request, for example, via a MAC-CE signal or an uplink control information (UCI) signal (e.g., over the direct link), to activate or deactivate the ability to redundancy feedback information to the transmitting UE, for example based on sidelink channel conditions or sidelink quality of service targets.

Aspects of the disclosure are initially described in the context of wireless communications systems. Aspects of the disclosure are further illustrated by and described with reference to encoding processes, wireless communications systems, protocol stack diagrams and process flows. Aspects of the disclosure are further illustrated by and described with reference to apparatus diagrams, system diagrams, and flowcharts that relate to adaptive rateless coding for sidelink communications.

FIG. 1 illustrates an example of a wireless communications system 100 that supports adaptive rateless coding for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT)

size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A first UE 115 within the geographic coverage area 110 of a base station 105 may transmit network-coded packets (e.g., packets encoded using a rateless encoding algorithm in accordance with an amount of redundancy) to a second UE 115 within the geographic coverage area 110 via a sidelink communication link 135. A base station 105 may transmit, over direct communication links 125, a configuration message to the UEs 115 including one or more parameters associated with a network coding configuration for data packets transmitted between the UEs 115 via the sidelink communication link 135. In some examples, the one or more parameters may be configured by an RRC configuration. For example, parameters associated with a network coding configuration may include a coding amount of redundancy, a rateless encoding algorithm, a quantity of subpackets into which to divide each packet for encoding using the rateless encoding algorithm, a corresponding rateless decoding algorithm, or a pool of transmission resources for the sidelink communication link 135.

After receiving the encoded packet from the first UE 115, the second UE 115 may decode the packet using the rateless decoding algorithm that corresponds to the rateless encoding algorithm and transmit a feedback message to the first UE 115 that indicates a sufficiency of the configured amount of redundancy for encoding using the rateless encoding algorithm. The feedback message may indicate that the configured amount of redundancy is sufficient for encoding using the rateless encoding algorithm, or, alternatively, the feedback message may indicate that the configured amount of redundancy is insufficient for encoding using the rateless encoding algorithm. The feedback message may in some cases include packet-level information (e.g., information based on the second UE 115 attempting to decode at least one entire packet transmitted by the first UE 115). The first UE 115 may adjust the amount of redundancy based on the feedback message and encode future packets for transmission to the second UE 115 using the adjusted amount of redundancy.

For example, the second UE 115 may transmit, to the first UE 115, redundancy feedback information that may include an estimated packet loss probability calculated by the second UE 115. The loss probability (p_loss) may be estimated as the number of received subpackets divided by the total amount of subpackets transmitted over a period of time T. In some cases, the second UE 115 may transmit, to the first UE 115, redundancy feedback information that may include a requested amount of redundancy. For example, the second UE 115 may calculate the desired redundancy R as R=M/(1−p_loss)−k. The second UE 115 may indicate the desired redundancy to the first UE 115 in the redundancy feedback message. In some cases, the second UE 115 may transmit, to the first UE 115, redundancy feedback information that may include a request to increase or decrease the redundancy by a given amount, for example based on whether the second UE 115 successfully decoded a received packet. In some cases, the second UE 115 may transmit, to the first UE 115, redundancy feedback information that may include a determination that decoding was successful or unsuccessful. The first UE 115 may increase or decrease the amount of redundancy based on whether the packet was successfully decoded.

In some cases, if the second UE 115 continues to fail to decode packets transmitted over the sidelink communication link 135 after redundancy updates by the first UE 115, the first UE 115 may request updated network coding algorithms and associated parameters from the base station. For example, if the second UE 115 indicates a threshold number of times that an amount of redundancy should be increased or that multiple subsequent packets were unsuccessfully decoded, the first UE 115 may request updated network coding algorithms and associated parameters from the base station 105. In response, the base station 105 may transmit updated network coding algorithms and associated parameters to the first UE 115 and the second UE 115. In some examples, the first UE 115 may request updated network coding algorithms and associated parameters from the base station 105 based on changing sidelink channel conditions or based on changing sidelink quality of service targets.

In some examples, the base station 105 may activate or deactivate, for example via a MAC-CE signal or a DCI signal, the ability of the second UE 115 to report redundancy feedback information to the first UE 115, for example based on channel conditions for sidelink communication link 135 or sidelink quality of service targets. The second UE 115 may request, for example, via a MAC-CE signal or an UCI signal (e.g., over the direct communication link 125), to activate or deactivate the ability to redundancy feedback information to the first UE 115, for example based on sidelink channel conditions or sidelink quality of service targets.

Figure 2:
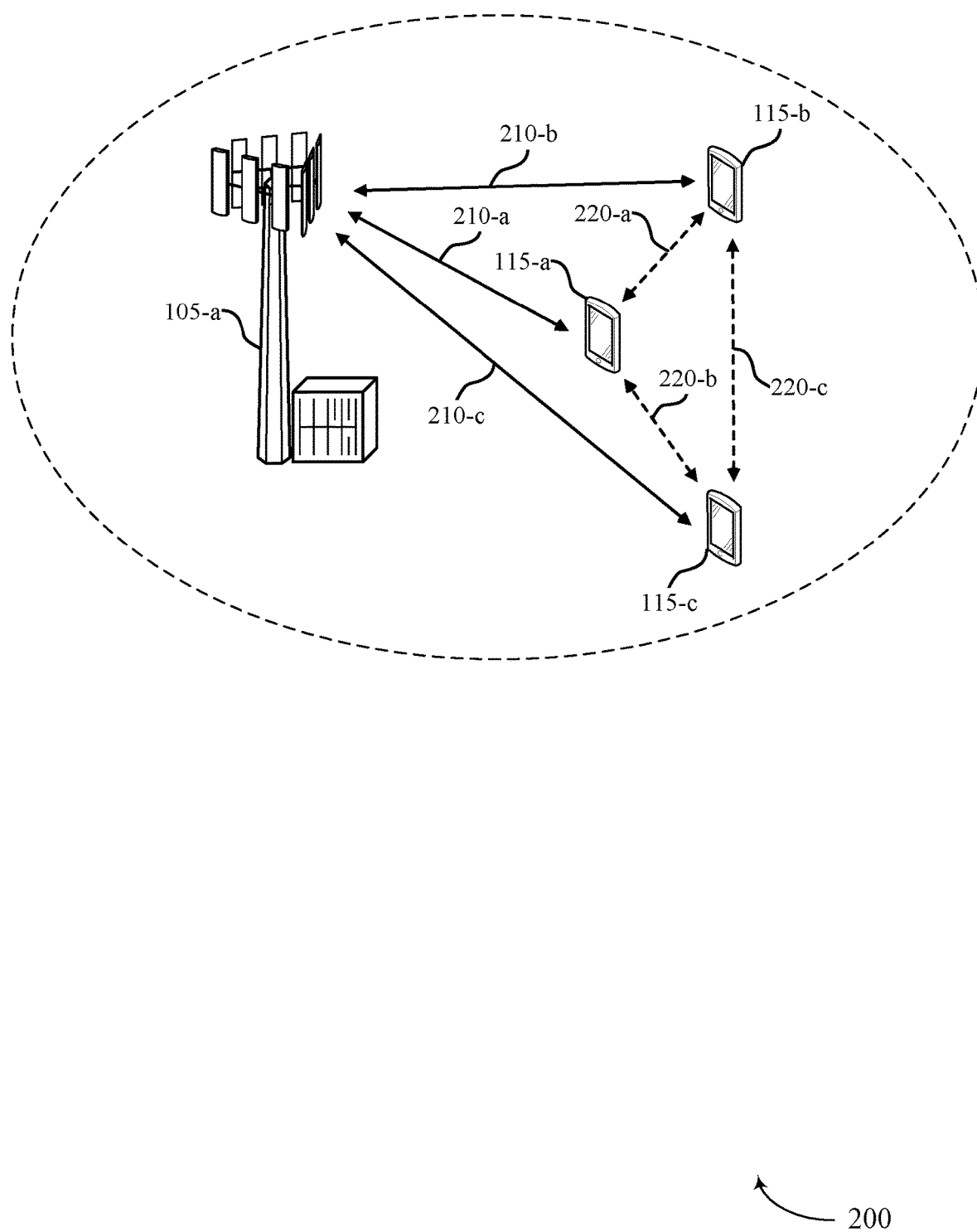
FIG. 2 illustrates an example of a wireless communications system that supports adaptive rateless coding for sidelink communications in accordance with aspects of the present disclosure.

FIG. 2 illustrates an example of a wireless communications system 200 that supports adaptive rateless coding for sidelink communications in accordance with aspects of the present disclosure. In some examples, wireless communications system 200 may implement or may be implemented by aspects of wireless communications system 100. For example, the wireless communications system 200 may include a base station 105-*a*, which may be an example of a base station 105 as described herein, and UE 115-*a*, UE 115-*b*, and UE 115-*c* which may be examples of UEs 115 as described herein.

The base station 105-*a* may communicate with one or more UEs 115. For example, the base station 105-*a* may communicate with UE 115-*a* via direct link 210-*a*, UE 115-*b* via direct link 210-*b*, and UE 115-*c* via direct link 210-*c*. Additionally or alternatively, at least some of the UEs 115 may communicate with each other via sidelink connections. For example, UE 115-*a* may communicate with UE 115-*b* using sidelink connection 220-*a*, UE 115-*b* may communicate with UE 115-*c* using sidelink connection 220-*c* and UE 115-*c* may communicate with UE 115-*a* using sidelink connection 220-*b*.

In some examples, the sidelink connections 220 may be configured by the base station 105-*a*. For example, the base station 105-*a* may configure communications and reporting for the sidelink connections 220. For example, the base station 105-*a* may transmit grants for sidelink communications to the UEs 115. The base station 105-*a* may indicate allocated resources, carrier frequencies, modulation and coding scheme values, transmission start and end times, etc. for communications on a sidelink connection 220. In some cases, the UEs 115 may communicate on the sidelink connections 220 according to the configurations from the base station 105-*a*.

The wireless communications system 200 may support network coding procedures (e.g., coding using rateless encoding and rateless decoding algorithms). Network coding may enable devices to create a function of information from a set of data packets and transmit the function of the data packets to a UE 115 (e.g., network-coded packets). Network coding may improve system efficiency and reliability. A device may generate a set of network-coded packets by merging some information from data packets together into network-coded packets. For example, the network-coded packets may include some information from each of the data packets. For example, metadata from two separate data packets may be merged into a network-coded packet. A receiver may be able to retrieve the original data packet if the receiver obtains sufficient information for the data packet from the network-coded packets. In some cases, the transmitter and the receiver may have the same set of network coding parameters to encode and decode the network-coded packets, so that the receiver and decode the network-coded packets and obtain the original data packets.

Network coding may in some cases be performed based on a rateless encoding scheme (e.g., algorithm) and corresponding decoding scheme. Some examples of codes for use with rateless encoding schemes may include fountain codes, such as Luby transform (LT) codes or rapid tornado (Raptor) codes. Raptor codes may be based on variations of low-density parity check (LDPC) and LT codes. A rateless code may not be associated with any fixed code rate (which may alternatively be referred to as coding rate). For example, a set of source symbols may be encoded using a rateless code to generate any quantity of encoded symbols, and the source symbols may be recovered based on decoding any sufficiently large group of encoded symbols—that is, it may not matter which particular encoded symbols are decoded by a receiving device, so long as a sufficient quantity of encoded symbols are decoded. In some examples, this may be because encoding the source symbols using a rateless code (e.g., fountain code) includes combining information related to one or more source symbols into each encoded symbol. Encoded symbols corresponding to (generated based on) a set of source symbols may be transmitted from a first node or device (which may be referred to as an input node) of a network to a second node or device (which may be referred to as an output node).

The base station 105-*a* may utilize network coding to transmit a message to one or more UEs 115. For example, the base station 105-*a* may transmit network-coded packets to the one or more UEs 115 via a direct links 210 instead of transmitting each individual data packet. The base station 105-*a* may indicate a set of network coding parameters to the one or more UEs 115. The network coding parameters may be synchronized between the base station 105-*a* and the one or more UEs 115 so that the one or more UEs 115 may decode the network-coded packets and retrieve the original data packets. The set of network coding parameters may include, for example, an encoding matrix, an encoding function, a decoding function, a quantity of subpackets into which to divide each packet, an amount of redundancy, a number of decoding iterations (e.g., a maximum number of decoding iterations) or any combination thereof. In some cases, the base station 105-*a* may configure the one or more UEs 115 with one or more sets of network coding parameters via the direct links 210.

Wireless communications systems described herein, such as the wireless communications system 200, support sending network-coded packets on a sidelink connection 220. For example, the UEs 115 may utilize network coding to generate network-coded packets and transmit network-coded information on sidelink connections. To support network coding techniques on a sidelink connection, the base station 105-*a* may configure the UEs 115 with one or more sets of network coding parameters. Configuring the UEs 115 with the one or more sets of network coding parameters may support transmission and decoding of network-coded packets on a sidelink connection 220.

In some examples, a UE 115 may generate network-coded packets for the sidelink connection 220 using the same network coding parameters as the direct links 210. For example, the base station 105-*a* may configure the UEs 115 with a set of network coding parameters. The set of network coding parameters may be used to generate network-coded packets which are transmitted on the direct links 210. A UE 115 may use the set of network-coded parameters to encode data packets and transmit the encoded packets to UEs 115 on a sidelink connection 220. For example, base station 105-*a* may configure UE 115-*a* to encode data packets missing at UE 115-*b* using the set of network coding parameters. The base station 105-*a* may configure UE 115-*a* to transmit functions of the data packets to UE 115-*b*. UE 115-*b* may receive the encoded packets and use the set of network coding parameters to decode the packets. For example, UE 115-*b* may decode the packets similar to decoding network-coded packets transmitted on the direct links 210. UE 115-*b* may obtain the missing data packets and send feedback to the base station 105-*a* to indicate the data packets were successfully decoded. UE 115-*a* may similarly transmit network-coded packets to UE 115-*c* for any missing data packets at UE 115-*c*.

In some cases, the base station 105-*a* may configure the UEs 115 with multiple sets of network coding parameters. For example, the base station 105-*a* may preconfigure the UEs 115 with a first set of network coding parameters and a second set of network coding parameters. In some examples, the UEs 115 may use the first set of coding parameters for direct link communications and use the second set of coding parameters for sidelink communications. Additionally or alternatively, the UEs 115 may be configured with multiple sets of network coding parameters which may be used for the direct links 210, the sidelink connections 220, or both. For example, the base station 105-*a* may configure UE 115-*a* to encode data packets missing at UE 115-*b* using the second set of network coding parameters. UE 115-*a* may transmit the function of the data packets to UE 115-*b* on sidelink connection 220-*a*. UE 115-*b* may receive the encoded packets, extract the second set of network coding parameters and decode the data packets. In some cases, UE 115-*a* may indicate that the second set of network coding parameters were used to generate the network-coded packets sent on sidelink connection 220-*a*. UE 115-*a* may similarly transmit network-coded packets to UE 115-*c* for any missing data packets at UE 115-*c*.

In some examples, network coding may be activated or deactivated for the sidelink connections 220. For example, the base station 105-*a* and the UEs 115 may activate or deactivate network coding based on channel quality, an overhead budget, or both. For example, if the channel quality is above a threshold or the overhead budget is below a threshold, network coding may be deactivated. For example, if network coding is deactivated, UE 115-*a* may send the original data packets to the UEs 115 missing data packets. Alternatively, if the channel quality value is below a threshold and the overhead budget is above a threshold, network coding may be activated. In some cases, the base station 105-*a* may activate or deactivate network coding on the sidelink connections. For example, the base station 105-*a* may determine the channel quality based on feedback from the UEs 115. The base station 105-*a* may indicate activation or deactivation via a MAC-CE signal or DCI signal. In some cases, the UEs 115 may request to activate or deactivate network coding on the sidelink connections 220. For example, the UEs 115 may detect data transmission quality on the sidelink connections 220 and send a request to activate or deactivate network coding to the base station 105-*a*. The request to activate or deactivate may be sent via a MAC-CE signal or a UCI signal.

Figure 3:
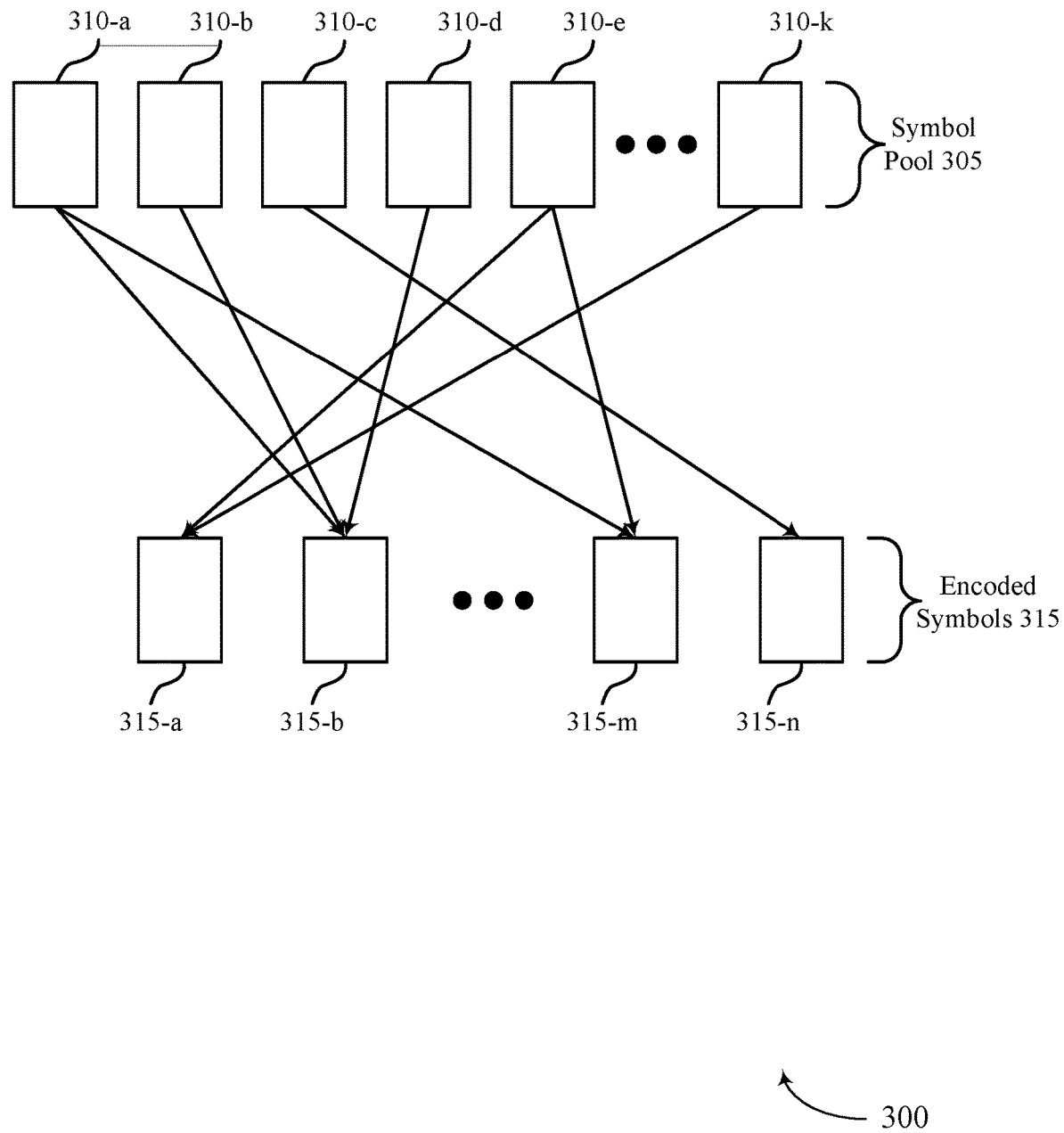
FIG. 3 illustrates an example of an encoding process that supports adaptive rateless coding for sidelink communications in accordance with aspects of the present disclosure.

FIG. 3 illustrates an example of an encoding process 300 that supports adaptive rateless coding for sidelink communications in accordance with aspects of the present disclosure. In some examples, encoding process 300 may implement aspects of or may be implemented by aspects of wireless communications systems 100 or 200. For example, encoding process 300 may use a fountain code, such as a rateless code that can be used by a base station 105 or a UEs 115 to encode a set of one or more packets. Encoding process 300 may represent an example of an encoding process that a transmitting device or encoder (e.g., a base station 105 or UE 115) may use when encoding a set of packets to transmit to a receiving device or decoder (e.g., a UE 115 or a base station 105). In particular, encoding process 300 may represent an example of such an encoding process that is based on an LT code.

The encoder may select a set of symbols from a symbol pool 305 to encode for transmitting to the decoder. For example, the symbol pool 305 may include k symbols 310, such as a first symbol 310-*a*, a second symbol 310-*b*, a third symbol 310-*c*, a fourth symbol 310-*d*, a fifth symbol 310-*e*, etc., to an k-th symbol 310-*n*. Each of the selected symbols 310 from the symbol pool 305 may be encoded by the encoder (e.g., the transmitting device, such as a UE 115, 115-*a*, 115-*b*, or 115-*c* or base station 105 or 105-*a*) to one or more encoded symbols 315, such as a first encoded symbol 315-*a*, a second encoded symbol 315-*b*, an m-th encoded symbol 315-*m*, and an n-th encoded symbol 315-*n*. The encoder may encode a number N encoded symbols 315, where N>k. In some cases, the encoding of the symbols 310 to the encoded symbols 315 may depend on a packet pool encoding function, ƒ, on which the encoder is operating. For example, the packet pool encoding function, ƒ, may include the encoder determining a degree, d, of each encoded symbol 315.

The degree may be chosen at random from a given node degree distribution, p(x). Subsequently, the encoder may choose 'd' distinct symbols 310 (e.g., information symbols) from the symbol pool 305 uniformly at random. These 'd' distinct symbols may be elements of the encoded symbol 315. For example, d=2 for the first encoding symbol 315-*a* with the fifth symbol 310-*e* and the n-th symbol 310-*n* being the elements of the first encoding symbol 315-*a*, d=3 for the second encoding symbol 315-*b* with the first symbol 310-*a* and the second symbol 310-*b* and the fourth symbol 310-*d* being the elements of the second encoding symbol 315-*b*, d=2 for the m-th encoding symbol 315-*m* with the first symbol 310-*a* and fifth symbol 310-*e* being the elements of the m-th encoding symbol 315-*m*, and d=1 for the n-th encoding symbol 315-*n* with the third symbol 310-*c* being the element of the n-th encoding symbol 315-*n*. The encoder may assign an exclusive or (XOR) operation of the chosen 'd' symbols 310 (e.g., information symbols) to the encoded symbol 315.

In some cases, an ideal solution distribution for the encoding process may include P1=1/k or Pi=1/i(i−1) for i=2, 3, . . . , k, with k representing the number of symbols 310 in the symbol pool 305. Additionally or alternatively, a robust soliton distribution for the encoding process may include Mi=(Pi+Ti)/B, for i=1, 2, . . . , k, where R/ik for i=1, . . . , k/R−1; Ti=R ln(R/δ)/k for i=k/R or Ti=0 for $$i = \frac{k}{R} + 1, \ldots, k;$$

R=c ln(k/δ)√k, where c is constant and δ is a decoding error probability; and B=sum(Pi+Ti) is a normalization factor.

Additionally or alternatively, a decodability threshold value, M (e.g., a decodable threshold), may be defined for encoding process 300 (e.g., using LT-based encoding). As long as a number of network encoded packets or symbols received at a receiving device is greater than or equal to M, decoding of a message carried by the network encoded packets can be successful for the receiver. In some examples, if M=k, then the decoding success probability for the receiving device may be up to 99%. If M=k+1, then the decoding success probability for the receiving device may be up to 99.99%. If M=k+2, then the decoding success probability for the receiving device may be up to 99.9999%.

For a decodable set with M, k<M<N. The size of N may be increased to improve reliability, or decreased to lessen unnecessary redundancy. That is, increased redundancy by an encoder may result in improved reception at a receiving device. However, if redundancy is increased too much, the system may experience increased delays due to inefficient utilization of available resources.

In some examples, as described in greater detail with reference to FIG. 4, a transmitting device may communicate with multiple receiving devices via multiple communication links. Further, multiple transmitting devices in a network (e.g., within the geographic coverage area 110 of a base station 105) may communicate via multiple links (e.g., with respect to FIG. 2, a UEs 115-*a*, 115-*b*, or 115-*c* may communicate with a base station 105-*a* via a direct links 210-*a*, 210-*b*, or 210-*c*). In such examples, different communication links (e.g., between a transmitting device and multiple receiving devices) may experience different channel conditions, resulting in different packet losses on the different communication links. If the amount of redundancy for all receiving devices is identical (e.g., inflexible), then some resources may be utilized inefficiently, and some transmissions may be more likely to fail.

For example, as illustrated in FIG. 2, a transmitting device (e.g., UE 115-*a*) may communicate with a base station 105-*a* via a direct link 210-*a* and with another UE 115-*b* via a sidelink connection 220-*a*. The sidelink connection 220-*a* may have a different path loss than the direct link 210-*a* (e.g., the sidelink connection 220-*a* may have high path loss and the direct link 210-*a* may have a low path loss, or vice versa). If the UE 115-*a* encodes and transmits signaling on both links using the same redundancy configuration (e.g., network coding with a same N value), then the packet transmission on the sidelink connection 220-*a* may not be successfully decoded (e.g., because the redundancy configuration of the network encoding on the sidelink connection 220-*a* is not high enough to compensate for the high packet loss), while transmissions on the direct link 210-*a* may unnecessarily utilize more resources than necessary (e.g., introducing more redundancy than necessary and utilizing extra resources that could be used for other communications). Thus, a fixed network coding redundancy configuration (e.g., a fixed N value) may result in inefficient use of available resources, failed transmissions, increased system latency, decreased reliability of communications, and decreased user experience.

A receiving UE 115, for example UE 115-*b* as illustrated in FIG. 2, may support adaptive network, or rateless, coding for sidelink communications, as described herein. For example, after receiving, from a transmitting UE 115-*a* via a sidelink connection 220-*a*, a network-coded packet encoded using a rateless encoding algorithm according to a first amount of redundancy, a receiving UE 115-*b* may decode the network-coded packet using the rateless decoding algorithm that corresponds to the rateless encoding algorithm used to encode the packet. The receiving UE 115-*b* may transmit a feedback message to the transmitting UE 115-*a* that indicates a sufficiency of the configured amount of redundancy for encoding using the rateless encoding algorithm. The feedback message may indicate that the configured amount of redundancy is sufficient for encoding using the rateless encoding algorithm, or, alternatively, the feedback message may indicate that the configured amount of redundancy is insufficient for encoding using the rateless encoding algorithm. Any information described herein as included in such a feedback message may in some cases be packet-level information (e.g., may be information that is based on a receiving UE 115-*b* attempting to decode one or more entire packets transmitted by a transmitting UE 115-*a*). The transmitting UE 115-*a* may adjust the amount of redundancy for the rateless encoding algorithm based on the redundancy feedback message, and encode future packets for transmission to the receiving UE 115-*b* using the adjusted amount of redundancy.

For example, the receiving UE 115-*b* may transmit, to the transmitting UE 115-*a*, redundancy feedback information that may include an estimated packet loss probability calculated by the receiving UE 115-*b*. The loss probability (p_loss) may be estimated as the number of received subpackets divided by the total amount of subpackets transmitted over a period of time T. In some cases, the receiving UE 115-*b* may transmit, to the transmitting UE 115-*a*, redundancy feedback information that may include a requested amount of redundancy. For example, the receiving UE 115-*b* may calculate the desired amount of redundancy R as R=M/(1−p_loss)−k. The receiving UE 115-*b* may indicate the desired redundancy to the transmitting UE 115-*a* in the redundancy feedback message. In some cases, the receiving UE 115-*b* may transmit, to the transmitting UE 115-*a*, redundancy feedback information that may include a request to increase or decrease the redundancy by a given amount, for example based on whether the receiving UE 115-*b* successfully decoded a received packet. In some cases, the receiving UE 115-*b* may transmit, to the transmitting UE 115-*a*, redundancy feedback information that may include a determination that decoding was successful or unsuccessful. The transmitting UE 115-*a* may increase or decrease the amount of redundancy based on whether the packet was successfully decoded.

In some cases, if the receiving UE 115-*b* continues to fail to decode packets transmitted over the sidelink connection 220-*a* after redundancy updates by the transmitting UE 115-*a*, the transmitting UE 115-*a* may request updated network coding algorithms and associated parameters from the base station 105-*a*. For example, if the receiving UE 115-*b* indicates a threshold number of times that an amount of redundancy should be increased or that multiple subsequent packets were unsuccessfully decoded, the transmitting UE 115-*a* may request updated network coding algorithms and associated parameters from the base station 105-*a*. In response, the base station 105-*a* may transmit updated network coding algorithms and associated parameters to the transmitting UE 115-*a* and the receiving UE 115-*b*. In some examples, the transmitting UE 115-*a* may request updated network coding algorithms and associated parameters from the base station 105-*a* based on changing channel conditions for sidelink connection 220-*a* or based on changing sidelink quality of service targets.

In some examples, the base station 105-*a* may activate or deactivate, for example via a MAC-CE signal or a DCI signal, the ability of the receiving UE 115-*b* to report redundancy feedback information to the transmitting UE 115-*a*, for example based on channel conditions for sidelink connection 220-*a* or sidelink quality of service targets. The receiving UE 115-*b* may request, for example, via a MAC-CE signal or an UCI signal (e.g., over the direct link 210-*b*), to activate or deactivate the ability to redundancy feedback information to the transmitting UE 115-a, for example based on channel conditions for sidelink connection 220-a conditions or sidelink quality of service targets.

Figure 4:
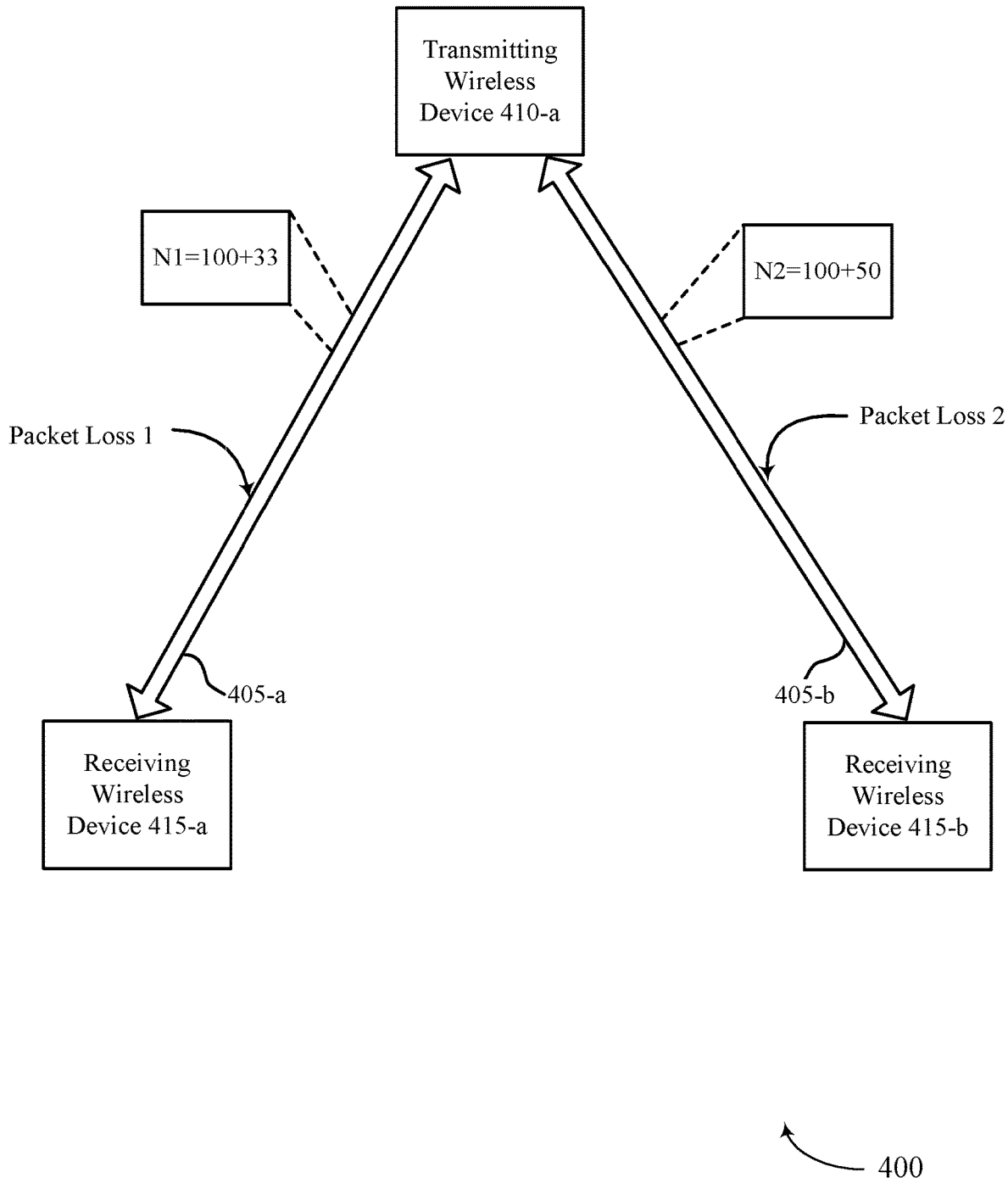
FIG. 4 illustrates an example of a wireless communications system that supports adaptive rateless coding for sidelink communications in accordance with aspects of the present disclosure.

FIG. 4 illustrates an example of a wireless communications system 400 that supports adaptive rateless coding for sidelink communications in accordance with aspects of the present disclosure. Wireless communications system 400 may implement aspects of or may be implemented by aspects of wireless communications systems 100 or 200. For example, wireless device 410-a may be a transmitting wireless device communicating with one or more receiving wireless devices 415. Transmitting wireless device 410-a may be an example of any transmitting device, such as a base station 105 as described herein, a UE 115 as described herein, or the like. Transmitting wireless device 410-a may communicate with receiving wireless device 415-a via communication link 405-a, and with receiving wireless device 415-b via communication link 405-b. The receiving wireless devices 415 may be, for example, UEs 115 or base stations 105 as described herein. The communication links may be Uu interfaces, PC5 interfaces, or the like.

The transmitting wireless device 410-a may encode and transmit control and data signaling to receiving wireless devices 415. In some examples, the transmitting wireless device 410-a may perform encoding (e.g., fountain coding, such as network encoding) on k original symbols or subpackets (e.g., where k=100) as described in greater detail with reference to FIG. 3, where the k original symbols or subpackets comprise a packet. In such examples, the transmitting wireless device 410-a may send N encoded symbols or subpackets to a receiving wireless device 415. Each receiving wireless device 415 may be associated with received M encoded symbols or subpackets (e.g., where M<N) to recover the original symbols or subpackets encoded by the transmitting wireless device 410-a with a given probability. For a given performance target, in some examples, a decoding success probability M may be fixed (e.g., M=120).

As described herein, different communication links may experience different channel conditions, resulting in different packet losses. For instance, communication link 405-a may experience packet loss probability 1 (e.g., 0.1), while communication link 405-b may experience packet loss probability 2 (e.g., 0.2). To achieve a similar network encoding performance for all receiving wireless devices (e.g., receiving wireless device 415-a and receiving wireless device 415-b), the transmitting wireless device 410-a may construct receiver-specific redundancies for corresponding network coding transmissions, as described herein. For example, for k=100 and M=120, a packet loss probability 1 (e.g., 10%) means that about 12 packets or symbols of the 120 packets or symbols may be lost. Thus, the transmitting wireless device 410-a may select a redundancy configuration resulting in N=133 for transmissions to receiving wireless device 415-a (e.g., 100 original symbols plus 20 to satisfy M=120 plus 13 to address packet loss probability 1 for communication link 405-a). Thus, even with path loss 1=0.1, if ten percent of the 120 encoded symbols decoded by the receiving wireless device 415-a are lost, the added redundancy of 13 encoded symbols may result in successful reception of the original one or more encoded packets by the receiving wireless device 415-a. Similarly, the transmitting wireless device 410-a may select a redundancy configuration resulting in N=150 for transmissions to receiving wireless device 415-b (e.g., 100 original symbols plus 20 to satisfy M=120 plus 30 to address packet loss probability 2 for 220 communication link 405-b).

For example, with reference to FIG. 2, a sidelink connection 220-a may have different channel conditions than a direct link 210-a. For example, the direct link 210-a may experience a packet loss probability of 1, while the sidelink connection 220-a may experience a packet loss probability of 2, as described with reference to FIG. 4. Accordingly, the receiving UE 115-b may provide feedback (e.g., packet-level feedback) indicating a sufficiency of the amount of redundancy for encoding using the rateless encoding algorithm for the sidelink connection 220-a, as described in greater detail with reference to FIG. 6.

For example, a receiving UE 115-b may estimate a packet loss probability for the sidelink connection 220-a. For instance, receiving UE 115-b may calculate, or otherwise determine, a packet loss probability (e.g., $P_{1_{oss}}$) as a packet delivery rate over a given period of time (e.g., T). The receiving UE 115-b may estimate a packet loss probability as a number of received packets divided by a total number of packets transmitted during time $$T\left(P_{loss} = \frac{\text{Number of Received Packets}}{\text{Total number of Transmitted Packets}}\right).$$

An amount of redundancy for the transmission may be calculated as redundancy $$R = \frac{M}{1 - P_{loss}} - k.$$

In some examples, the receiving UE 115-b may transmit a packet loss probability report (e.g., including an indication of $P_{loss}$) to the transmitting UE 115-a, and the transmitting UE 115-a may select (e.g., calculate) an amount of redundancy (e.g., a value for R) and encode future packets for transmission to the receiving UE 115-b according to the updated amount of redundancy. In some examples, the receiving UE 115-b may calculate the amount of redundancy (e.g., value for R), and may transmit an indication of a requested amount of redundancy to the transmitting UE 115-a. In some examples, the redundancy may be calculated through a lookup table (LUT), which may map a given packet loss probability $P_{loss}$ to a redundancy value R. In some examples, the base station 105-a may transmit the lookup table to the receiving UE 115-b and/or the transmitting UE 115-a, for example in a configuration message or via RRC. The receiving UE 115-b may map the calculated $P_{loss}$ to the corresponding R and transmit an indication (e.g., an index corresponding to the LUT) of the corresponding R to the base station 105-a. In some examples, the receiving UE 115-b may transmit an indication of a calculated $P_{loss}$ to the transmitting UE 115-a and the transmitting UE 115-a may map the indicated $P_{loss}$ to a corresponding R via the LUT.

In some cases, the receiving UE 115-b may transmit, to the transmitting UE 115-a, redundancy feedback information that may include a request to increase or decrease the amount of redundancy R, for example based on whether the receiving UE 115-b successfully decoded a received packet. In some examples, the receiving UE 115-b may request the transmitting UE 115-a to increase or decrease the amount of redundancy R by a given amount (e.g., a step size A) based on whether the receiving UE 115-b successfully decoded a received packet. In some cases, the receiving UE 115-b may transmit, to the transmitting UE 115-a, redundancy feedback information that may include a determination that decoding of a packet was successful or unsuccessful. The transmitting UE 115-*a* may increase or decrease the amount of redundancy R based on whether the packet was successfully decoded. In some examples, the transmitting UE 115-*a* may increase or decrease the amount of redundancy R by a given amount (e.g., a step size A) based on whether the packet was successfully decoded.

Figure 5:
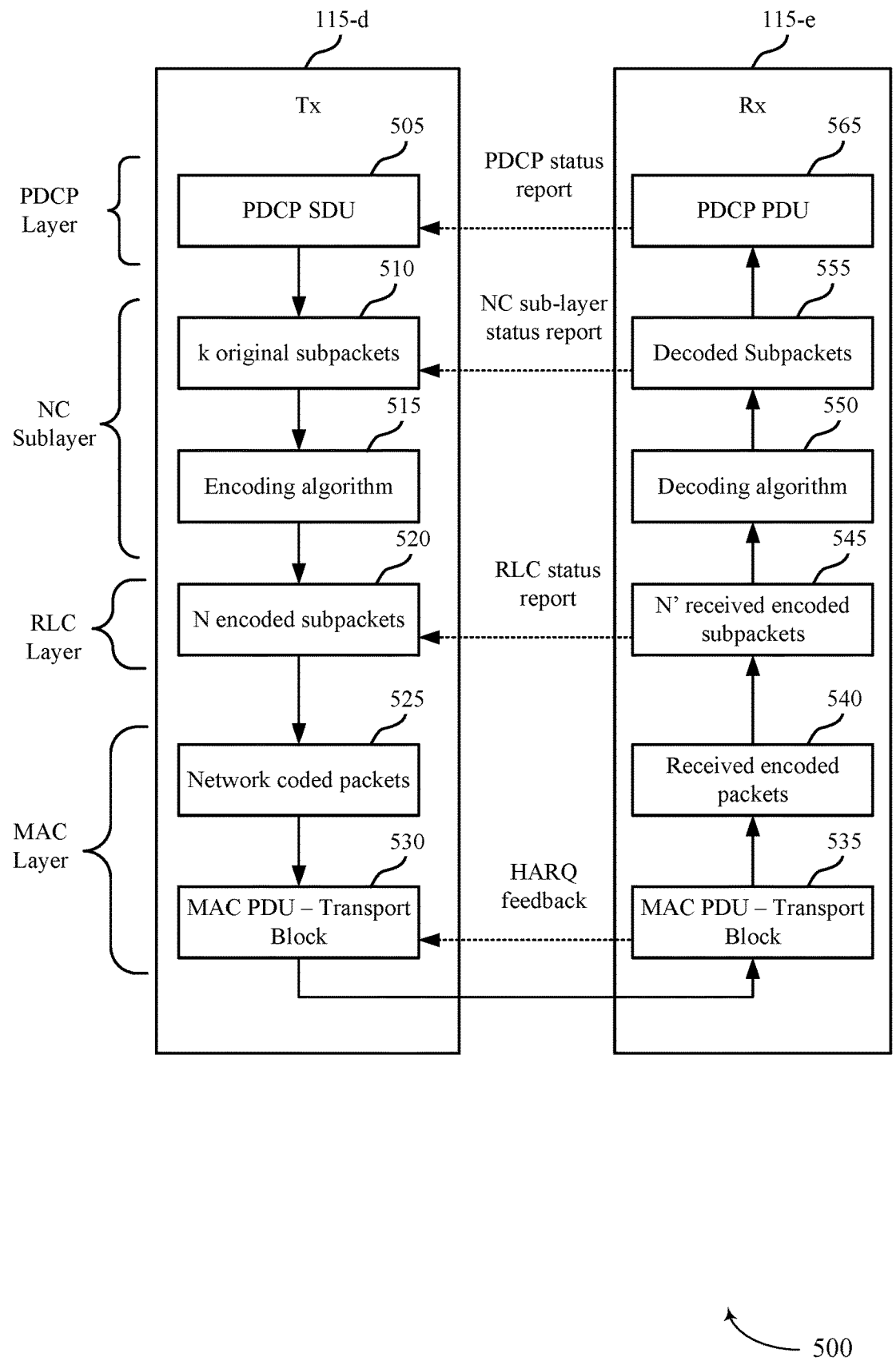
FIG. 5 illustrates an example of a protocol stack diagram that supports adaptive rateless coding for sidelink communications in accordance with aspects of the present disclosure.

FIG. 5 illustrates an example of a protocol stack diagram 500 that supports adaptive rateless coding for sidelink communications in accordance with aspects of the present disclosure. Protocol stack diagram 500 may implement aspects of or may be implemented by aspects of wireless communications systems 100 or 200. For example, UEs 115-*d* and 115-*e* may be examples of a UE 115 as described herein.

A transmitting UE 115-*d* may include a packet data convergence protocol service data unit (PDCP SDU) 505 and a receiving UE 115-*e* may include a packet data convergence protocol (PDCP) protocol data unit (PDU) 565. The PDCP SDU 505 and the PDCP PDU 565 may operate in the packet data convergence protocol (PDCP) layer.

When transmitting a network encoded packet, the transmitting UE 115-*d* may divide an original data packet into a quantity k PDCP subpackets at 510 within a network coding layer and encode the k PDCP subpackets using a rateless encoding algorithm 515. At the radio link control (RLC) layer, at 520, the encoding algorithm generates a quantity N encoded subpackets, where N is a greater number than k. The difference between N and k corresponds to an amount of redundancy associated with the rateless encoding algorithm 515. The N encoded subpackets are then passed to the MAC layer at 800 525 and transmitted across the air interface in a MAC protocol data unit (MAC PDU) transport block at 530.

At the receiving UE 115-*e*, the receiving UE 115-*e* receives the MAC PDU transport block at 535. The encoded subpackets in the MAC layer at 540 are passed to the RLC layer at 545. The receiving UE 115-*e* may receive a lesser quantity N' of subpackets than the N subpackets that the transmitting UE 115-*d* transmitted due to channel conditions (e.g., due to pathloss on the sidelink channel). If N' is greater than a number M (where M is less than N, but greater than k), then the receiving UE 115-*e* may be able to recover the original k subpackets with a with a desired probability (e.g., 99%).

The N' received encoded packets are passed through a decoding algorithm 550 corresponding to the encoding algorithm 515 in the network coding sublayer. The decoding algorithm 550 outputs a number of decoded packets 555 which are combined to form the original packet at the PDCP PDU 565. As discussed herein, the receiving UE 115-*e* may transmit feedback information (e.g., packet-level feedback information) to the transmitting UE 115-*d* regarding whether the receiving UE 115-*e* successfully decoded the packet or whether to increase or decrease the redundancy associated with the rateless coding algorithm.

Figure 6:
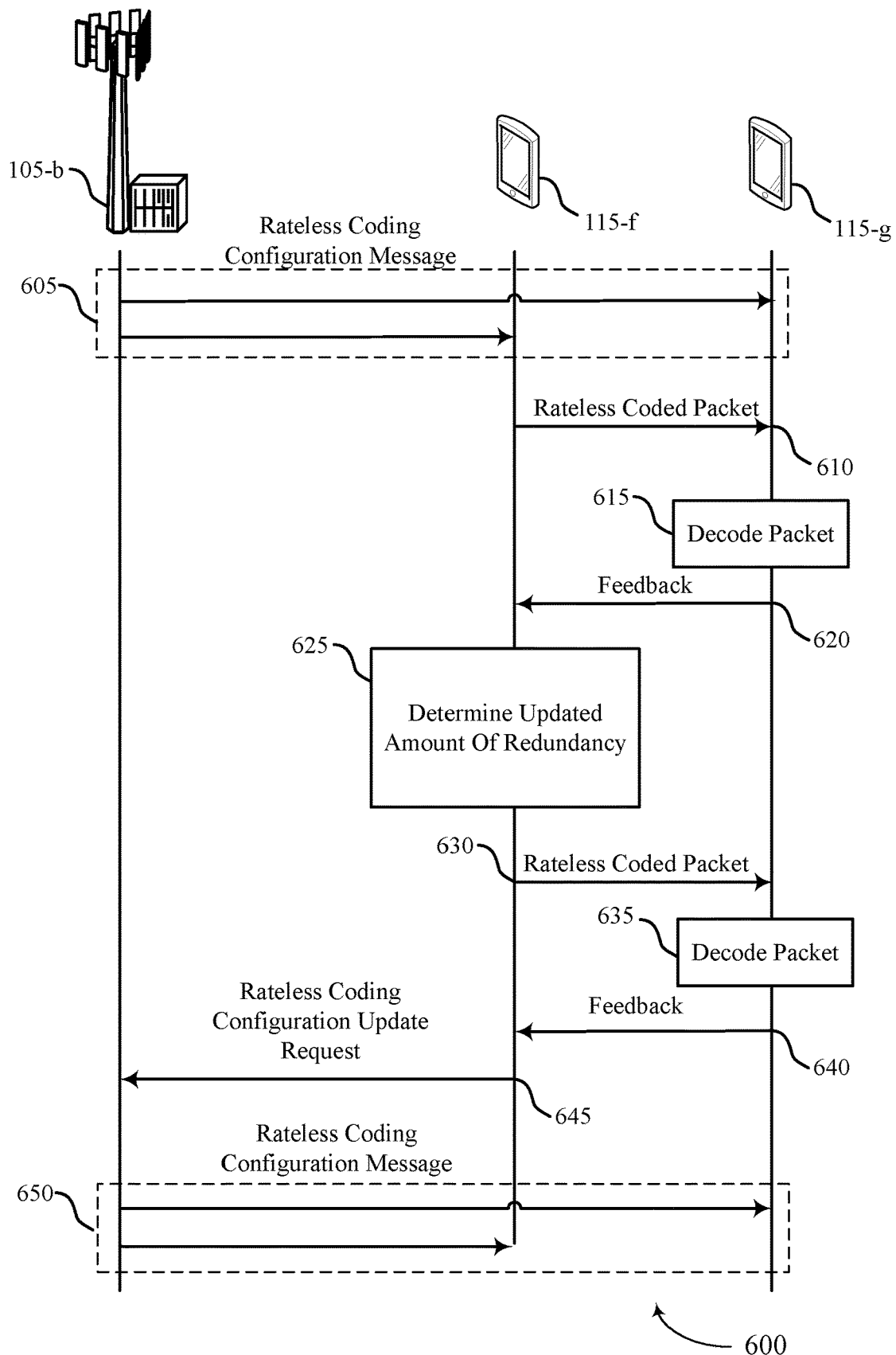
FIG. 6 illustrates an example of a process flow that supports adaptive rateless coding for sidelink communications in accordance with aspects of the present disclosure.

FIG. 6 illustrates an example of a process flow 600 that supports adaptive rateless coding for sidelink communications in accordance with aspects of the present disclosure. Process flow 600 may implement aspects of or may be implemented by aspects of wireless communications systems 100 or 200. For example, base station 105-*b* may be an example of a base station 105 as described herein, and UEs 115-*f* and 115-*g* may be examples of a UE 115 as described herein.

At 605, the base station 105-*b* may transmit, to the UEs 115-*f* and 115-*g*, signaling that indicates a first amount or redundancy to use for encoding using a rateless encoding algorithm (e.g., for a network coding procedure). In some examples, the base station 105-*b* may also transmit, to the UEs 115-*f* and 115-*g*, one or more other parameters associated with the rateless coding, for example a quantity of subpackets into which to divide each packet for encoding using the rateless encoding algorithm, an indication of the rateless encoding algorithm, an indication of a rateless decoding algorithm, or an indication of a pool of transmission resources for sidelink communications between the UEs 115-*f* and 115-*g*.

At 610, the transmitting UE 115-*f*, encodes a first packet using the rateless encoding algorithm and in accordance with the first amount of redundancy indicated by the base station 105-*b*, and transmits the encoded packet to the receiving UE 115-*g*. In some cases, encoding the first packet using the rateless encoding algorithm and in accordance with the first amount of redundancy includes dividing the first packet into a set of subpackets including a first quantity of subpackets, and generating a set of encoded subpackets based on the set of subpackets and using the rateless encoding algorithm, where the set of encoded subpackets includes a second quantity of encoded subpackets that is greater than the first quantity of subpackets, and where the first amount of redundancy for encoding using the rateless encoding algorithm is a difference between the second quantity of encoded subpackets and the first quantity of subpackets.

At 615, the receiving UE 115-*g* decodes the first packet using a decoding algorithm that corresponds to the encoding algorithm. In some cases, decoding the first packet using the rateless decoding algorithm includes: identifying a set of encoded subpackets received for the first packet, the set of encoded subpackets including a first quantity of encoded subpackets greater than or equal to a second quantity of original subpackets encoded using the rateless encoding algorithm; decoding the set of encoded subpackets to obtain a set of decoded subpackets including a third quantity of decoded subpackets, the third quantity greater than or equal to the second quantity; and attempting to obtain the first packet based at least in part on the set of decoded subpackets.

At 620, the receiving UE 115-*g* transmits, to the transmitting UE 115-*f*, a message including information that indicates a sufficiency of the first amount of redundancy for encoding using the rateless encoding algorithm based on the decoding of the first packet at 615. In some cases, at 620, the information that indicates a sufficiency of the first amount of redundancy may be packet-level information, and thus may be based on whether one or more entire packets (e.g., entire sets of sub-packets, each entire set of sub-packets being the complete set of sub-packets for a corresponding packet) was successfully decoded. In some cases, the receiving UE 115-*g* may transmit, to the base station 105-*b*, a request to transmit the information that indicates the sufficiency of the first amount of redundancy for encoding using the rateless encoding algorithm. In response, the base station 105-*b* may transmit a grant to the receiving UE 115-*g*. In some cases, the receiving UE 115-*g* may transmit the message including information that indicates a sufficiency of the first amount of redundancy for encoding using the rateless encoding algorithm based on receiving the grant. In some cases, the receiving UE 115-*g* may transmit, to the base station 105-*b*, the request to transmit the information that indicates the sufficiency of the first amount of redundancy for encoding using the rateless encoding algorithm based on a condition of the sidelink channel or a quality of service target associated with the sidelink channel. In some cases, the receiving UE 115-*g* may receive, from the base station 105-*b*, a request to transmit the information that indicates the sufficiency of the first amount of redundancy for encoding using the rateless encoding algorithm, and the receiving UE 115-*g* may transmit the message comprising the information that indicates the sufficiency of the first amount of redundancy for encoding using the rateless encoding algorithm based on the request from the base station 105-*b*.

At 625, the transmitting UE 115-*f* determines a second amount of redundancy for encoding using the rateless encoding algorithm based on the feedback information received at 620.

Depending on whether the redundancy is sufficient or not, the message including packet-level information that indicates a sufficiency of the first amount of redundancy may include a message that the first amount of redundancy is sufficient for encoding using the rateless encoding algorithm, or, alternatively, the message may indicate that the first amount of redundancy is insufficient for encoding using the rateless encoding algorithm. Whether the amount of redundancy is sufficient or insufficient may be communicated in various ways. In some cases, the message including information that indicates a sufficiency of the first amount of redundancy transmitted at 620 may include an estimated packet loss probability calculated by the receiving UE 115-*g*. For example, the receiving UE 115-*g* may estimate the loss probability based on determining a first quantity of subpackets received by the receiving UE 115-*g* during a time period and a second quantity of subpackets transmitted by the transmitting UE 115-*f* during the time period, where the loss probability is based on a ratio between the first quantity of subpackets received by the receiving UE 115-*g* and the second quantity of subpackets transmitted by the transmitting UE 115-*f* during the time period. At 625, the transmitting UE 115-*f* may determine the second amount of redundancy based on the indicated packet loss probability (p_loss). For example, the transmitting UE 115-*f* may calculate the second amount of redundancy R as R=M/(1−p_loss)−k. In some examples, the transmitting UE 115-*f* may calculate the second amount of redundancy R through a lookup table, which may map a given packet loss probability $P_{loss}$ to a redundancy value R. In some examples, the base station 105-*b* may transmit the lookup table to the receiving UE 115-*g* and/or the transmitting UE 115-*f*.

In some cases, the message including information that indicates a sufficiency of the first amount of redundancy transmitted at 620 may include a desired amount of redundancy. For example, the receiving UE 115-*g* may calculate the packet loss probability (p_loss) and calculate the desired amount of redundancy based on the packet loss probability (e.g., via determining R through R=M/(1−p_loss)−k or via a lookup table). The transmitting UE 115-*f* may determine the second amount of redundancy based on the indicated desired amount of redundancy.

In some cases, the message including information that indicates a sufficiency of the first amount of redundancy transmitted at 620 may include a request to increase or decrease the amount of redundancy R, for example, based on whether the receiving UE 115-*g* successfully decoded the received packet. In some examples, the message including information that indicates a sufficiency of the first amount of redundancy transmitted at 620 may include a request increase or decrease the amount of redundancy R by a given amount (e.g., a step size A), for example, based on whether the receiving UE 115-*g* successfully decoded the received packet.

In some cases, the message including information that indicates a sufficiency of the first amount of redundancy transmitted at 620 may include an indication that decoding of a packet was successful or unsuccessful. At 625, the transmitting UE 115-*f* may increase or decrease the amount of redundancy R based on the indication at 620 of whether the packet was successfully decoded. In some examples, the transmitting UE 115-*f* may increase or decrease the amount of redundancy R by a given amount (e.g., a step size A) based on the indication at 620 of whether the packet was successfully decoded.

In some cases, a message including information that indicates a sufficiency of an amount of redundancy may include multiple types of such information described herein (e.g., any type of information that indicates a sufficiency of an amount of redundancy may be included in a message in combination with any other type of information that indicates a sufficiency of an amount of redundancy). For example, a message that includes information that indicates a sufficiency of an amount of redundancy may include any combination of one or more of information that indicates a different amount of redundancy, a request to decrease the amount of redundancy, a request to increase the amount of redundancy, an indication of whether a packet was successfully decoded, or any combination thereof.

At 630, the transmitting UE 115-*f* encodes a second packet using the rateless encoding algorithm and in accordance with the determined second amount of redundancy, and transmits the encoded packet to the receiving UE 115-*g*. At 635, the receiving UE 115-*g* decodes the second packet using the decoding algorithm that corresponds to the encoding algorithm.

At 640, the receiving UE 115-*g* transmits, to the transmitting UE 115-*f*, a message including information that indicates a sufficiency of the second amount of redundancy for encoding using the rateless encoding algorithm based on the decoding of the second packet at 635. The information that indicates the sufficiency of the second amount of redundancy may be packet-level information. The information that indicates the sufficiency of the second amount of redundancy may be packet-level information also may indicate that the second amount of redundancy is sufficient or, alternatively, insufficient.

In some cases, the transmitting UE 115-*f* will return to 625 and determine an updated amount of redundancy based on the redundancy feedback received at 640. In some cases, if receiving UE 115-*g* indicates that it continues to fail to successfully decode the packet, at 645, the transmitting UE 115-*f* may transmit, to the base station 105-*b*, a request to switch from using the rateless encoding algorithm to using a different rateless encoding algorithm. In response, at 650, the base station 105-*b* may transmit an indication of a second rateless encoding algorithm to the transmitting UE 115-*f* and an indication of a corresponding second rateless decoding algorithm to the receiving UE 115-*g*. The transmitting UE 115-*f* may encode, and the receiving UE 115-*g* may decode, future packets based on the received second rateless encoding and second rateless decoding algorithms.

Figure 7:
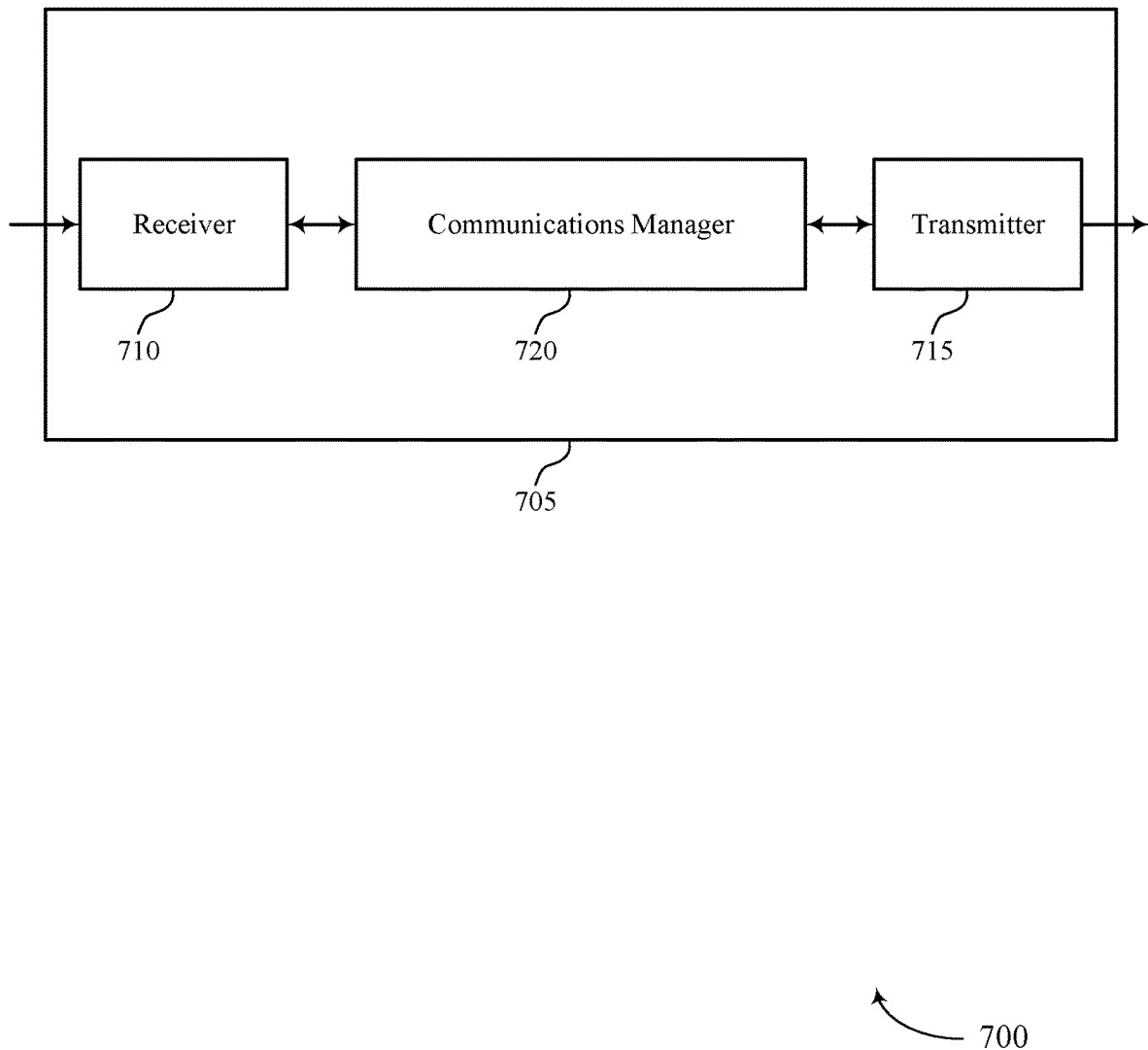
FIGS. 7 and 8 show block diagrams of devices that support adaptive rateless coding for sidelink communications in accordance with aspects of the present disclosure.

FIG. 7 shows a block diagram 700 of a device 705 that supports adaptive rateless coding for sidelink communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to adaptive network coding for sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to adaptive rateless coding for sidelink communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of adaptive rateless coding for sidelink communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving, from a base station, signaling that indicates a first amount of redundancy for encoding using a rateless encoding algorithm. The communications manager 720 may be configured as or otherwise support a means for encoding a first packet using the rateless encoding algorithm and in accordance with the first amount of redundancy to obtain an encoded first packet. The communications manager 720 may be configured as or otherwise support a means for transmitting the encoded first packet to a second UE via a sidelink channel. The communications manager 720 may be configured as or otherwise support a means for receiving, from the second UE, a message including information (e.g., packet-level information) that indicates a sufficiency of the first amount of redundancy for encoding using the rateless encoding algorithm. The communications manager 720 may be configured as or otherwise support a means for encoding a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm. The communications manager 720 may be configured as or otherwise support a means for transmitting the encoded second packet to the second UE via the sidelink channel.

Additionally or alternatively, the communications manager 720 may support wireless communications at a second UE in accordance with examples as disclosed herein. For example, the communications manager 720 may be configured as or otherwise support a means for receiving, from a base station, signaling that indicates a first amount of redundancy for encoding using a rateless encoding algorithm. The communications manager 720 may be configured as or otherwise support a means for receiving, from a first UE via a sidelink channel, a packet encoded using the rateless encoding algorithm and in accordance with the first amount of redundancy. The communications manager 720 may be configured as or otherwise support a means for decoding the packet using a rateless decoding algorithm that corresponds to the rateless encoding algorithm. The communications manager 720 may be configured as or otherwise support a means for transmitting, to the first UE based on decoding the packet using the rateless decoding algorithm, a message including information (e.g., packet-level information) that indicates a sufficiency of the first amount of redundancy for encoding using the rateless encoding algorithm.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for may support techniques for more efficient utilization of communication resources, which may results in more efficient encoding and decoding of packets.

Figure 8:
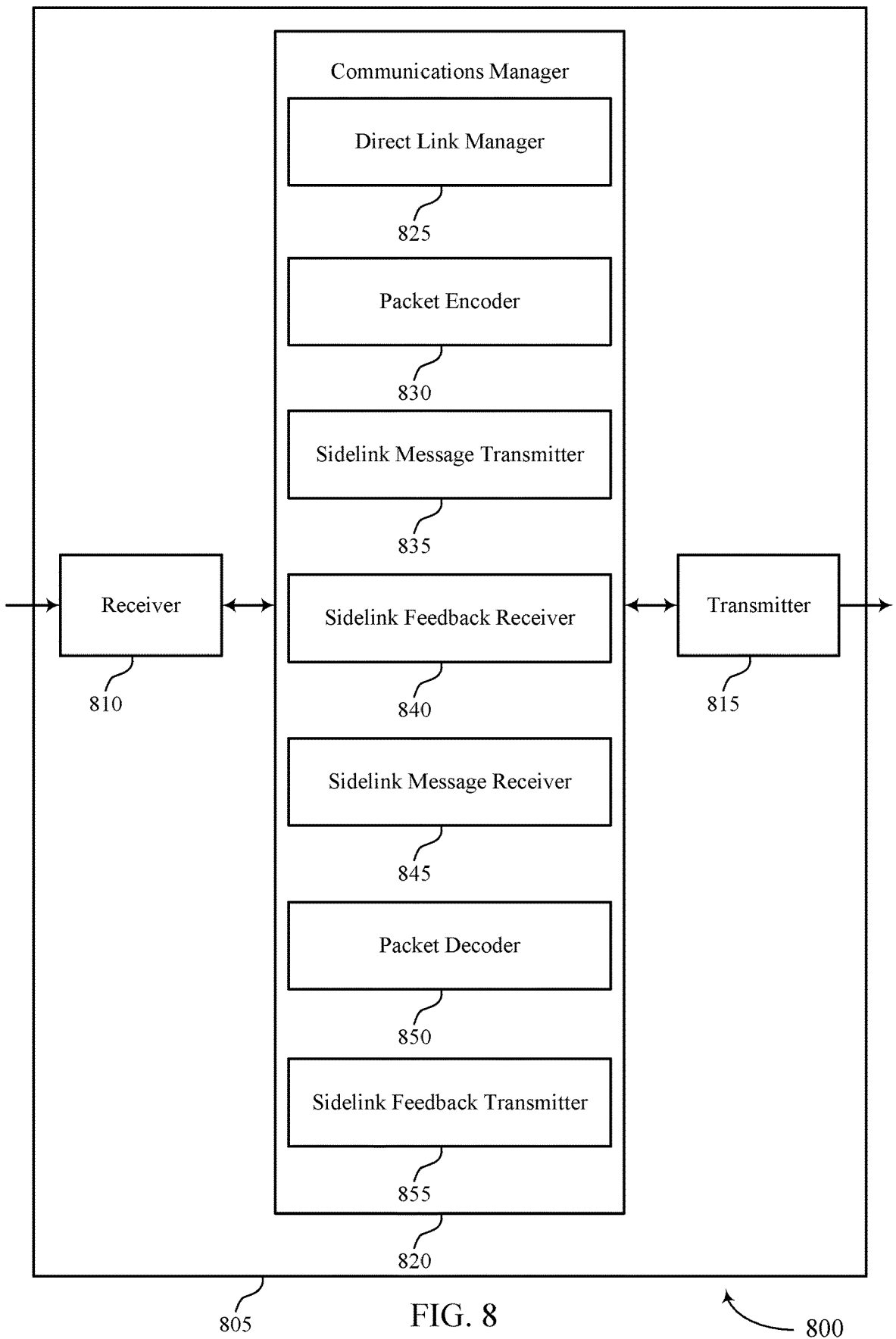

FIG. 8 shows a block diagram 800 of a device 805 that supports adaptive rateless coding for sidelink communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to adaptive rateless coding for sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to adaptive rateless coding for sidelink communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of adaptive rateless coding for sidelink communications as described herein. For example, the communications manager 820 may include a direct link manager 825, a packet encoder 830, a sidelink message transmitter 835, a sidelink feedback receiver 840, a sidelink message receiver 845, a packet decoder 850, a sidelink feedback transmitter 855, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The direct link manager 825 may be configured as or otherwise support a means for receiving, from a base station, signaling that indicates a first amount of redundancy for encoding using a rateless encoding algorithm. The packet encoder 830 may be configured as or otherwise support a means for encoding a first packet using the rateless encoding algorithm and in accordance with the first amount of redundancy to obtain an encoded first packet. The sidelink message transmitter 835 may be configured as or otherwise support a means for transmitting the encoded first packet to a second UE via a sidelink channel. The sidelink feedback receiver 840 may be configured as or otherwise support a means for receiving, from the second UE, a message including information (e.g., packet-level information) that indicates a sufficiency of the first amount of redundancy for encoding using the rateless encoding algorithm. The packet encoder 830 may be configured as or otherwise support a means for encoding a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm. The sidelink message transmitter 835 may be configured as or otherwise support a means for transmitting the encoded second packet to the second UE via the sidelink channel.

Additionally or alternatively, the communications manager 820 may support wireless communications at a second UE in accordance with examples as disclosed herein. The direct link manager 825 may be configured as or otherwise support a means for receiving, from a base station, signaling that indicates a first amount of redundancy for encoding using a rateless encoding algorithm. The sidelink message receiver 845 may be configured as or otherwise support a means for receiving, from a first UE via a sidelink channel, a packet encoded using the rateless encoding algorithm and in accordance with the first amount of redundancy. The packet decoder 850 may be configured as or otherwise support a means for decoding the packet using a rateless decoding algorithm that corresponds to the rateless encoding algorithm. The sidelink feedback transmitter 855 may be configured as or otherwise support a means for transmitting, to the first UE based on decoding the packet using the rateless decoding algorithm, a message including information (packet-level information) that indicates a sufficiency of the first amount of redundancy for encoding using the rateless encoding algorithm.

Figure 9:
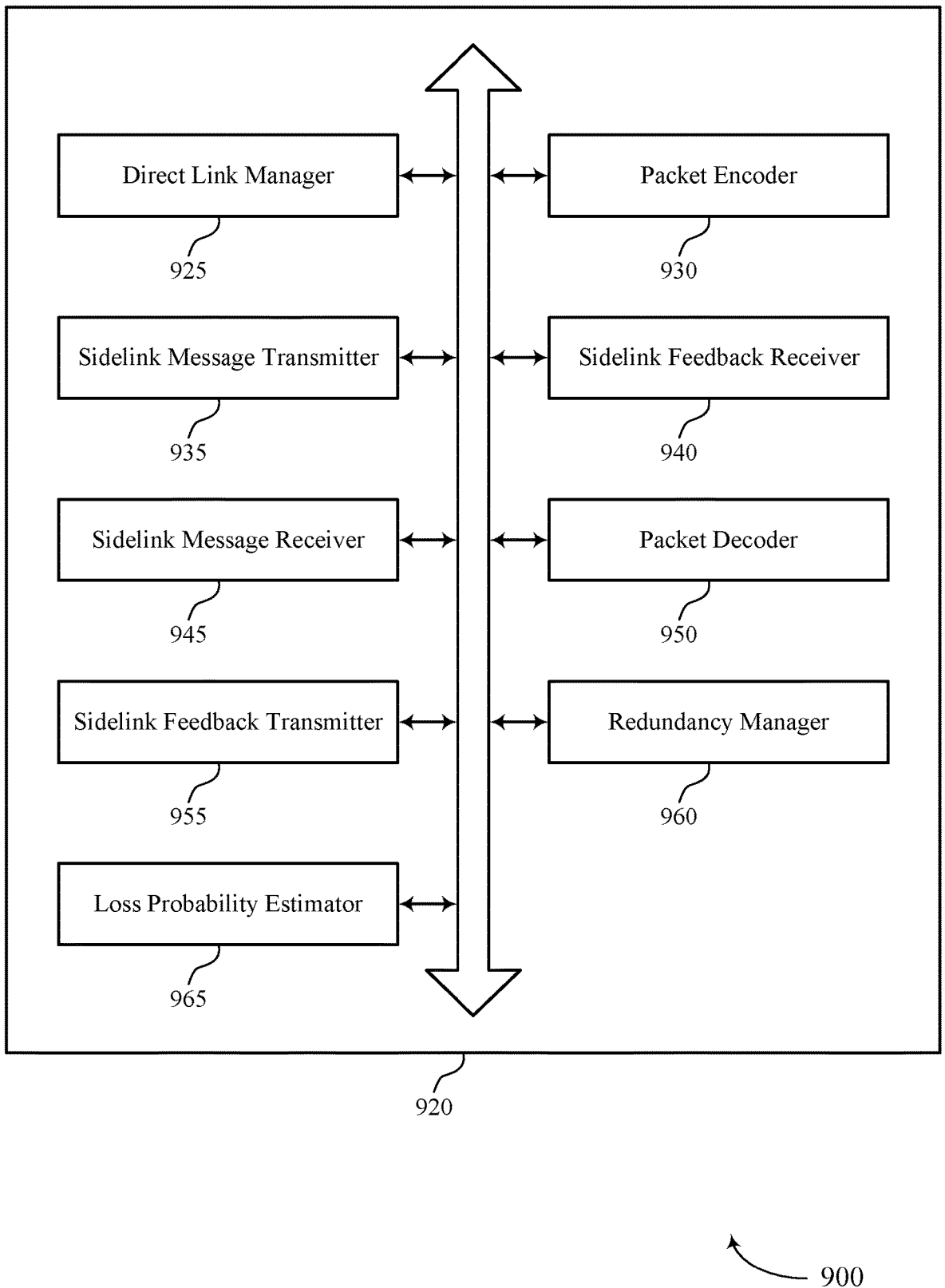
FIG. 9 shows a block diagram of a communications manager that supports adaptive rateless coding for sidelink communications in accordance with aspects of the present disclosure.

FIG. 9 shows a block diagram 900 of a communications manager 920 that supports adaptive rateless coding for sidelink communications in accordance with aspects of the present disclosure. The communications manager 920 may be an example of aspects of a communications manager 720, a communications manager 820, or both, as described herein. The communications manager 920, or various components thereof, may be an example of means for performing various aspects of adaptive rateless coding for sidelink communications as described herein. For example, the communications manager 920 may include a direct link manager 925, a packet encoder 930, a sidelink message transmitter 935, a sidelink feedback receiver 940, a sidelink message receiver 945, a packet decoder 950, a sidelink feedback transmitter 955, a redundancy manager 960, a loss probability estimator 965, or any combination thereof. Each of these components may communicate, directly or indirectly, with one another (e.g., via one or more buses).

The communications manager 920 may support wireless communications at a first UE in accordance with examples as disclosed herein. The direct link manager 925 may be configured as or otherwise support a means for receiving, from a base station, signaling that indicates a first amount of redundancy for encoding using a rateless encoding algorithm. The packet encoder 930 may be configured as or otherwise support a means for encoding a first packet using the rateless encoding algorithm and in accordance with the first amount of redundancy to obtain an encoded first packet. The sidelink message transmitter 935 may be configured as or otherwise support a means for transmitting the encoded first packet to a second UE via a sidelink channel. The sidelink feedback receiver 940 may be configured as or otherwise support a means for receiving, from the second UE, a message including information (e.g., packet-level information) that indicates a sufficiency of the first amount of redundancy for encoding using the rateless encoding algorithm. In some examples, the packet encoder 930 may be configured as or otherwise support a means for encoding a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm. In some examples, the sidelink message transmitter 935 may be configured as or otherwise support a means for transmitting the encoded second packet to the second UE via the sidelink channel.

In some examples, the information that indicates the sufficiency of the first amount of redundancy indicates an estimated loss probability for the first packet, and the redundancy manager 960 may be configured as or otherwise support a means for determining the second amount of redundancy based on the estimated loss probability.

In some examples, to support determining the second amount of redundancy based on the estimated loss probability, the redundancy manager 960 may be configured as or otherwise support a means for identifying the second amount of redundancy based on an index value for a lookup table, where the index value for the lookup table corresponds to the estimated loss probability.

In some examples, to support receiving the message including the information that indicates the sufficiency of the first amount of redundancy, the sidelink feedback receiver 940 may be configured as or otherwise support a means for receiving, in the message, an indication of the second amount of redundancy.

In some examples, to support receiving the message including the information that indicates the sufficiency of the first amount of redundancy, the sidelink feedback receiver 940 may be configured as or otherwise support a means for receiving, in the message, a request to decrease an amount of redundancy for encoding using the rateless encoding algorithm, where the second amount of redundancy is less than the first amount of redundancy.

In some examples, to support receiving the message including the information that indicates the sufficiency of the first amount of redundancy, the sidelink feedback receiver 940 may be configured as or otherwise support a means for receiving, in the message, a request to increase an amount of redundancy for encoding using the rateless encoding algorithm, where the second amount of redundancy is greater than the first amount of redundancy.

In some examples, to support receiving the message including the information that indicates the sufficiency of the first amount of redundancy, the sidelink feedback receiver 940 may be configured as or otherwise support a means for receiving, in the message, an indication of whether the first packet was successfully decoded, where the second amount of redundancy is based on the indication.

In some examples, to support encoding the first packet using the rateless encoding algorithm, the packet encoder 930 may be configured as or otherwise support a means for dividing the first packet into a set of subpackets including a first quantity of subpackets. In some examples, to support encoding the first packet using the rateless encoding algorithm, the packet encoder 930 may be configured as or otherwise support a means for generating a set of encoded subpackets based on the set of subpackets and using the rateless encoding algorithm, where the set of encoded subpackets includes a second quantity of encoded subpackets that is greater than the first quantity of subpackets, and where an amount of redundancy for encoding using the rateless encoding algorithm includes a difference between the second quantity of encoded subpackets and the first quantity of subpackets.

In some examples, the sidelink feedback receiver 940 may be configured as or otherwise support a means for receiving, from the second UE, a second message including information (e.g., packet-level information) that indicates a second sufficiency of the second amount of redundancy for encoding using the rateless encoding algorithm. In some examples, the direct link manager 925 may be configured as or otherwise support a means for transmitting, to the base station and based on the information that indicates the second sufficiency of the second amount of redundancy for encoding using the rateless encoding algorithm, a request to switch from using the rateless encoding algorithm to using a different rateless encoding algorithm for sidelink communications. In some examples, the direct link manager 925 may be configured as or otherwise support a means for receiving, from the base station, an indication of a second rateless encoding algorithm that includes the different rateless encoding algorithm. In some examples, the packet encoder 930 may be configured as or otherwise support a means for encoding a third packet using the second rateless encoding algorithm to obtain an encoded third packet. In some examples, the sidelink message transmitter 935 may be configured as or otherwise support a means for transmitting the encoded third packet to the second UE via the sidelink channel.

In some examples, the direct link manager 925 may be configured as or otherwise support a means for receiving an indication of a quantity of subpackets into which to divide each packet for encoding using the rateless encoding algorithm, an indication of the rateless encoding algorithm, an indication of a rateless decoding algorithm, an indication of a pool of transmission resources for sidelink communications by the first UE, or any combination thereof.

Additionally or alternatively, the communications manager 920 may support wireless communications at a second UE in accordance with examples as disclosed herein. In some examples, the direct link manager 925 may be configured as or otherwise support a means for receiving, from a base station, signaling that indicates a first amount of redundancy for encoding using a rateless encoding algorithm. The sidelink message receiver 945 may be configured as or otherwise support a means for receiving, from a first UE via a sidelink channel, a packet encoded using the rateless encoding algorithm and in accordance with the first amount of redundancy. The packet decoder 950 may be configured as or otherwise support a means for decoding the packet using a rateless decoding algorithm that corresponds to the rateless encoding algorithm. The sidelink feedback transmitter 955 may be configured as or otherwise support a means for transmitting, to the first UE based on decoding the packet using the rateless decoding algorithm, a message including information (e.g., packet-level information) that indicates a sufficiency of the first amount of redundancy for encoding using the rateless encoding algorithm.

In some examples, the loss probability estimator 965 may be configured as or otherwise support a means for estimating a loss probability for the packet, where the information that indicates the sufficiency of the first amount of redundancy for encoding using the rateless encoding algorithm indicates the estimated loss probability for the packet.

In some examples, to support estimating the loss probability for the packet, the loss probability estimator 965 may be configured as or otherwise support a means for determining a first quantity of subpackets received by the second UE during a time period and a second quantity of subpackets transmitted by the first UE during the time period, the loss probability based on a ratio between the first quantity of subpackets received by the second UE and the second quantity of subpackets transmitted by the first UE during the time period.

In some examples, the loss probability estimator 965 may be configured as or otherwise support a means for estimating a loss probability for the packet. In some examples, the redundancy manager 960 may be configured as or otherwise support a means for determining a second amount of redundancy based on the estimated loss probability for the packet, where the information that indicates the sufficiency of the first amount of redundancy for encoding using the rateless encoding algorithm indicates the second amount of redundancy.

In some examples, to support determining the second amount of redundancy based on the estimated loss probability, the redundancy manager 960 may be configured as or otherwise support a means for identifying the second amount of redundancy based on an index value for a lookup table, where the index value for the lookup table corresponds to the estimated loss probability.

In some examples, to support transmitting the message including the information that indicates the sufficiency of the first amount of redundancy, the sidelink feedback transmitter 955 may be configured as or otherwise support a means for transmitting, in the message, a request to increase an amount of redundancy.

In some examples, to support transmitting the message including the information that indicates the sufficiency of the first amount of redundancy, the sidelink feedback transmitter 955 may be configured as or otherwise support a means for transmitting, in the message, a request to decrease an amount of redundancy.

In some examples, to support transmitting the message including the information that indicates the sufficiency of the first amount of redundancy, the sidelink feedback transmitter 955 may be configured as or otherwise support a means for transmitting, in the message, an indication of whether the packet was successfully decoded.

In some examples, to support decoding the packet using the rateless decoding algorithm, the packet decoder 950 may be configured as or otherwise support a means for identifying a set of encoded subpackets received for the packet, the set of encoded subpackets including a first quantity of encoded subpackets greater than or equal to a second quantity of original subpackets encoded using the rateless encoding algorithm. In some examples, to support decoding the packet using the rateless decoding algorithm, the packet decoder 950 may be configured as or otherwise support a means for decoding the set of encoded subpackets to obtain a set of decoded subpackets including a third quantity of decoded subpackets, the third quantity greater than or equal to the second quantity. In some examples, to support decoding the packet using the rateless decoding algorithm, the packet decoder 950 may be configured as or otherwise support a means for attempting to obtain the packet based on the set of decoded subpackets.

In some examples, a probability of success for decoding the packet using the rateless decoding algorithm is based on a difference between the first quantity of encoded subpackets and the second quantity of original subpackets.

In some examples, the direct link manager 925 may be configured as or otherwise support a means for transmitting, to the base station, a request to transmit the information that indicates the sufficiency of the first amount of redundancy for encoding using the rateless encoding algorithm. In some examples, the direct link manager 925 may be configured as or otherwise support a means for receiving, from the base station, a grant in response to the request, where the message including the information that indicates the sufficiency of the first amount of redundancy for encoding using the rateless encoding algorithm is transmitted based on the grant from the base station.

In some examples, transmitting the request to transmit the information that indicates the sufficiency of the first amount of redundancy for encoding using the rateless encoding algorithm is based on one of a condition of the sidelink channel or a quality of service target associated with the sidelink channel.

In some examples, the direct link manager 925 may be configured as or otherwise support a means for receiving, from the base station, a request to transmit the information that indicates the sufficiency of the first amount of redundancy for encoding using the rateless encoding algorithm, where transmitting the message including the information that indicates the sufficiency of the first amount of redundancy for encoding using the rateless encoding algorithm is transmitted based on the request from the base station.

In some examples, the sidelink message receiver 945 may be configured as or otherwise support a means for receiving, from the first UE via the sidelink channel, a second packet encoded using the rateless encoding algorithm and in accordance with a second amount of redundancy different than the first amount of redundancy, the second amount of redundancy different than the first amount of redundancy and based on the sufficiency of the first amount of redundancy for encoding using the rateless encoding algorithm.

In some examples, the direct link manager 925 may be configured as or otherwise support a means for receiving an indication of a quantity of original subpackets for the packet encoded using the rateless encoding algorithm, an indication of the rateless encoding algorithm, an indication of the rateless decoding algorithm, an indication of a pool of transmission resources for sidelink communications by the second UE, or any combination thereof.

Figure 10:
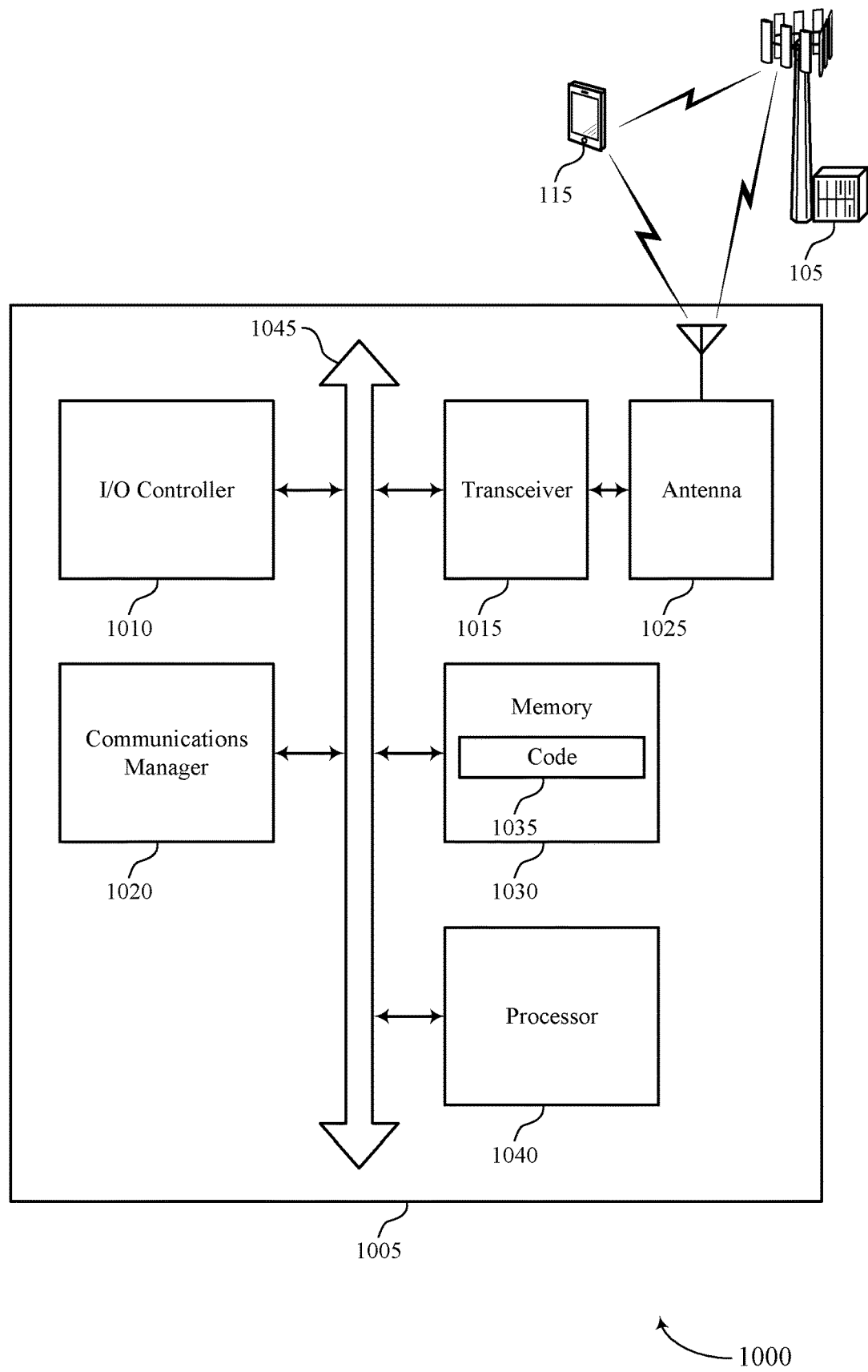
FIG. 10 shows a diagram of a system including a device that supports adaptive rateless coding for sidelink communications in accordance with aspects of the present disclosure.

FIG. 10 shows a diagram of a system 1000 including a device 1005 that supports adaptive rateless coding for sidelink communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting adaptive rateless coding for sidelink communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving, from a base station, signaling that indicates a first amount of redundancy for encoding using a rateless encoding algorithm. The communications manager 1020 may be configured as or otherwise support a means for encoding a first packet using the rateless encoding algorithm and in accordance with the first amount of redundancy to obtain an encoded first packet. The communications manager 1020 may be configured as or otherwise support a means for transmitting the encoded first packet to a second UE via a sidelink channel. The communications manager 1020 may be configured as or otherwise support a means for receiving, from the second UE, a message including information (e.g., packet-level information) that indicates a sufficiency of the first amount of redundancy for encoding using the rateless encoding algorithm. The communications manager 1020 may be configured as or otherwise support a means for encoding a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm. The communications manager 1020 may be configured as or otherwise support a means for transmitting the encoded second packet to the second UE via the sidelink channel.

Additionally or alternatively, the communications manager 1020 may support wireless communications at a second UE in accordance with examples as disclosed herein. For example, the communications manager 1020 may be configured as or otherwise support a means for receiving, from a base station, signaling that indicates a first amount of redundancy for encoding using a rateless encoding algorithm. The communications manager 1020 may be configured as or otherwise support a means for receiving, from a first UE via a sidelink channel, a packet encoded using the rateless encoding algorithm and in accordance with the first amount of redundancy. The communications manager 1020 may be configured as or otherwise support a means for decoding the packet using a rateless decoding algorithm that corresponds to the rateless encoding algorithm. The communications manager 1020 may be configured as or otherwise support a means for transmitting, to the first UE based on decoding the packet using the rateless decoding algorithm, a message including information (e.g., packet-level information) that indicates a sufficiency of the first amount of redundancy for encoding using the rateless encoding algorithm.

By including or configuring the communications manager 1020 in accordance with examples as described herein, the device 1005 may support techniques for may support techniques for improved communication reliability and more efficient utilization of communication resources, for example by reducing packet loss and reducing excess redundancy.

In some examples, the communications manager 1020 may be configured to perform various operations (e.g., receiving, monitoring, transmitting) using or otherwise in cooperation with the transceiver 1015, the one or more antennas 1025, or any combination thereof. For example, the communications manager 1020 may be configured to receive or transmit messages or other signaling as described herein via the transceiver 1015. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of adaptive rateless coding for sidelink communications as described herein, or the processor 1040 and the memory 1030 may be otherwise configured to perform or support such operations.

Figure 11:
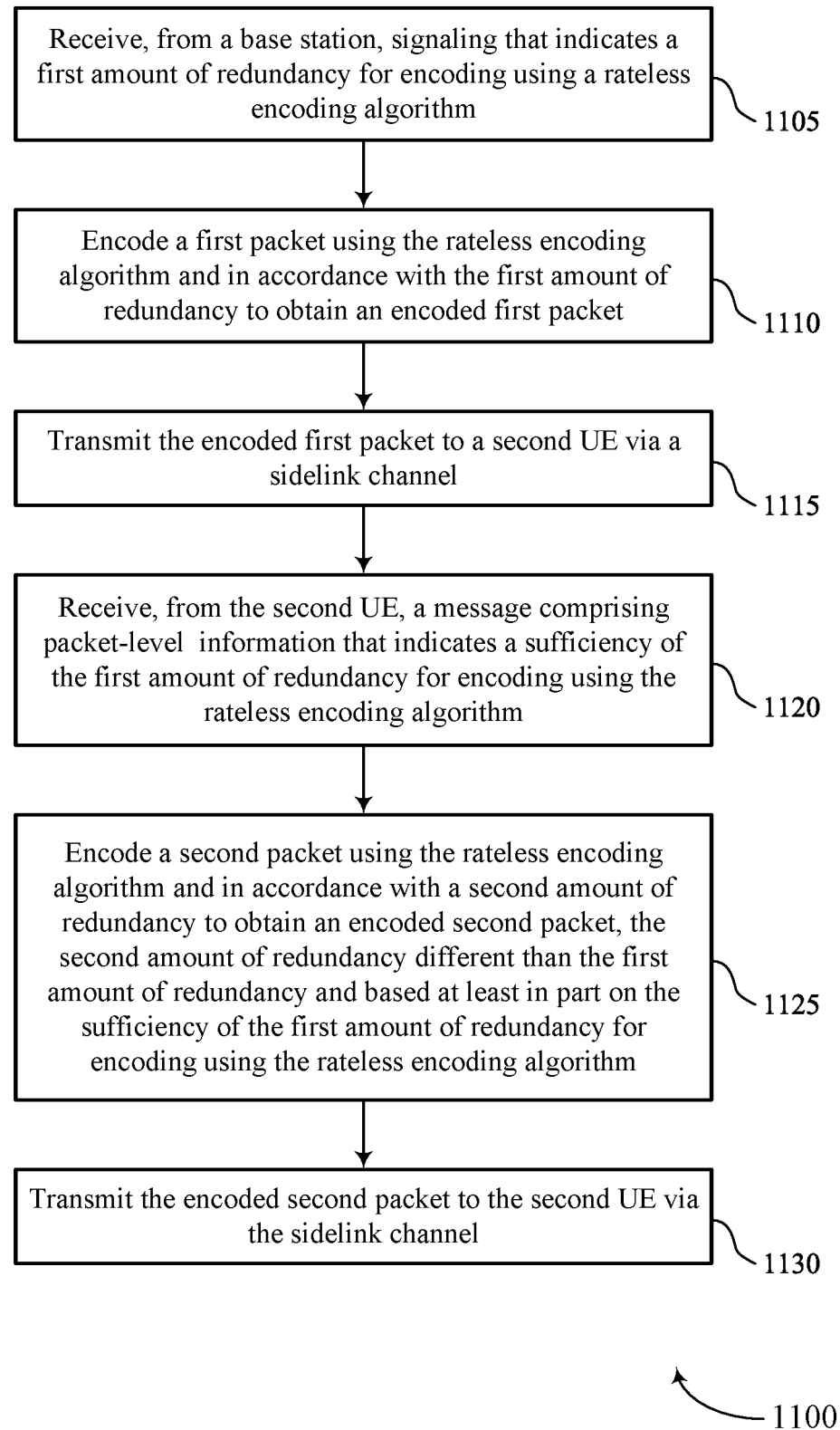
FIGS. 11 through 19 show flowcharts illustrating methods that support adaptive rateless coding for sidelink communications in accordance with aspects of the present disclosure.

FIG. 11 shows a flowchart illustrating a method 1100 that supports adaptive rateless coding for sidelink communications in accordance with aspects of the present disclosure.

The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, signaling that indicates a first amount of redundancy for encoding using a rateless encoding algorithm. The operations of 1105 may be performed in accordance with examples as disclosed herein. In some examples, aspects of the operations of 1105 may be performed by a direct link manager 925 as described with reference to FIG. 9. Additionally or alternatively, means for performing 1105 may, but not necessarily, include, for example, antenna 1025, transceiver 1015, communications manager 1020, memory 1030 (including code 1035), processor 1040 and/or bus 1045.

At 1110, the method may include encoding a first packet using the rateless encoding algorithm and in accordance with the first amount of redundancy to obtain an encoded first packet. The operations of 1110 may be performed in accordance with examples as disclosed herein. In some examples, aspects of the operations of 1110 may be performed by a packet encoder 930 as described with reference to FIG. 9. Additionally or alternatively, means for performing 1110 may, but not necessarily, include, for example, antenna 1025, transceiver 1015, communications manager 1020, memory 1030 (including code 1035), processor 1040 and/or bus 1045.

At 1115, the method may include transmitting the encoded first packet to a second UE via a sidelink channel. The operations of 1115 may be performed in accordance with examples as disclosed herein. In some examples, aspects of the operations of 1115 may be performed by a sidelink message transmitter 935 as described with reference to FIG. 9. Additionally or alternatively, means for performing 1115 may, but not necessarily, include, for example, antenna 1025, transceiver 1015, communications manager 1020, memory 1030 (including code 1035), processor 1040 and/or bus 1045.

At 1120, the method may include receiving, from the second UE, a message including packet-level information that indicates a sufficiency of the first amount of redundancy for encoding using the rateless encoding algorithm. The message may indicate that the first amount of redundancy is sufficient for encoding using the rateless encoding algorithm, or, alternatively, the message may indicate that the first amount of redundancy is insufficient for encoding using the rateless encoding algorithm, as discussed above. The operations of 1120 may be performed in accordance with examples as disclosed herein. In some examples, aspects of the operations of 1120 may be performed by a sidelink feedback receiver 940 as described with reference to FIG. 9. Additionally or alternatively, means for performing 1120 may, but not necessarily, include, for example, antenna 1025, transceiver 1015, communications manager 1020, memory 1030 (including code 1035), processor 1040 and/or bus 1045.

At 1125, the method may include encoding a second packet using the rateless encoding algorithm and in accordance with a second amount of redundancy to obtain an encoded second packet, the second amount of redundancy different than the first amount of redundancy and based on the sufficiency of the first amount of redundancy for encoding using the rateless encoding algorithm. The operations of 1125 may be performed in accordance with examples as disclosed herein. In some examples, aspects of the operations of 1125 may be performed by a packet encoder 930 as described with reference to FIG. 9. Additionally or alternatively, means for performing 1125 may, but not necessarily, include, for example, antenna 1025, transceiver 1015, communications manager 1020, memory 1030 (including code 1035), processor 1040 and/or bus 1045.

At 1130, the method may include transmitting the encoded second packet to the second UE via the sidelink channel. The operations of 1130 may be performed in accordance with examples as disclosed herein. In some examples, aspects of the operations of 1130 may be performed by a sidelink message transmitter 935 as described with reference to FIG. 9. Additionally or alternatively, means for performing 1130 may, but not necessarily, include, for example, antenna 1025, transceiver 1015, communications manager 1020, memory 1030 (including code 1035), processor 1040 and/or bus 1045.

Figure 12:
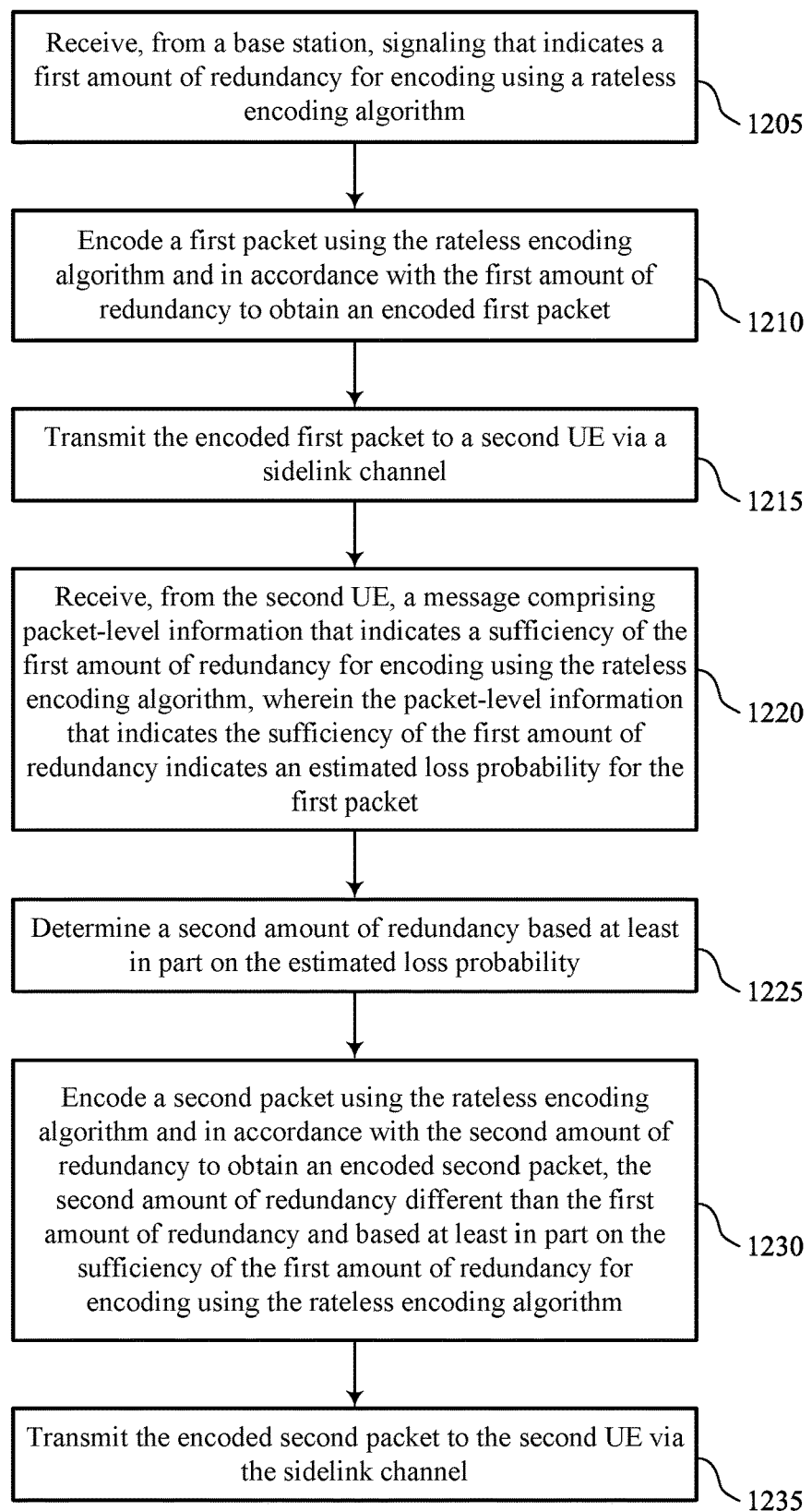

FIG. 12 shows a flowchart illustrating a method 1200 that supports adaptive rateless coding for sidelink communications in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, signaling that indicates a first amount of redundancy for encoding using a rateless encoding algorithm. The operations of 1205 may be performed in accordance with examples as disclosed herein. In some examples, aspects of the operations of 1205 may be performed by a direct link manager 925 as described with reference to FIG. 9. Additionally or alternatively, means for performing 1205 may, but not necessarily, include, for example, antenna 1025, transceiver 1015, communications manager 1020, memory 1030 (including code 1035), processor 1040 and/or bus 1045.

At 1210, the method may include encoding a first packet using the rateless encoding algorithm and in accordance with the first amount of redundancy to obtain an encoded first packet. The operations of 1210 may be performed in accordance with examples as disclosed herein. In some examples, aspects of the operations of 1210 may be performed by a packet encoder 930 as described with reference to FIG. 9. Additionally or alternatively, means for performing 1210 may, but not necessarily, include, for example, antenna 1025, transceiver 1015, communications manager 1020, memory 1030 (including code 1035), processor 1040 and/or bus 1045.

At 1215, the method may include transmitting the encoded first packet to a second UE via a sidelink channel. The operations of 1215 may be performed in accordance with examples as disclosed herein. In some examples, aspects of the operations of 1215 may be performed by a sidelink message transmitter 935 as described with reference to FIG. 9. Additionally or alternatively, means for performing 1215 may, but not necessarily, include, for example, antenna 1025, transceiver 1015, communications manager 1020, memory 1030 (including code 1035), processor 1040 and/or bus 1045.

At 1220, the method may include receiving, from the second UE, a message including packet-level information that indicates a sufficiency of the first amount of redundancy for encoding using the rateless encoding algorithm, wherein the packet-level information that indicates the sufficiency of the first amount of redundancy indicates an estimated loss probability for the first packet. The operations of 1220 may be performed in accordance with examples as disclosed herein. In some examples, aspects of the operations of 1220 may be performed by a sidelink feedback receiver 940 as described with reference to FIG. 9. Additionally or alternatively, means for performing 1220 may, but not necessarily, include, for example, antenna 1025, transceiver 1015, communications manager 1020, memory 1030 (including code 1035), processor 1040 and/or bus 1045.

At 1225, the method may include determining a second amount of redundancy based on the estimated loss probability. The operations of 1225 may be performed in accordance with examples as disclosed herein. In some examples, aspects of the operations of 1225 may be performed by a redundancy manager 960 as described with reference to FIG. 9. Additionally or alternatively, means for performing 1225 may, but not necessarily, include, for example, antenna 1025, transceiver 1015, communications manager 1020, memory 1030 (including code 1035), processor 1040 and/or bus 1045.

At 1230, the method may include encoding a second packet using the rateless encoding algorithm and in accordance with the second amount of redundancy to obtain an encoded second packet, the second amount of redundancy different than the first amount of redundancy and based on the sufficiency of the first amount of redundancy for encoding using the rateless encoding algorithm. The operations of 1230 may be performed in accordance with examples as disclosed herein. In some examples, aspects of the operations of 1230 may be performed by a packet encoder 930 as described with reference to FIG. 9. Additionally or alternatively, means for performing 1230 may, but not necessarily, include, for example, antenna 1025, transceiver 1015, communications manager 1020, memory 1030 (including code 1035), processor 1040 and/or bus 1045.

At 1235, the method may include transmitting the encoded second packet to the second UE via the sidelink channel. The operations of 1235 may be performed in accordance with examples as disclosed herein. In some examples, aspects of the operations of 1235 may be performed by a sidelink message transmitter 935 as described with reference to FIG. 9. Additionally or alternatively, means for performing 1235 may, but not necessarily, include, for example, antenna 1025, transceiver 1015, communications manager 1020, memory 1030 (including code 1035), processor 1040 and/or bus 1045.

Figure 13:
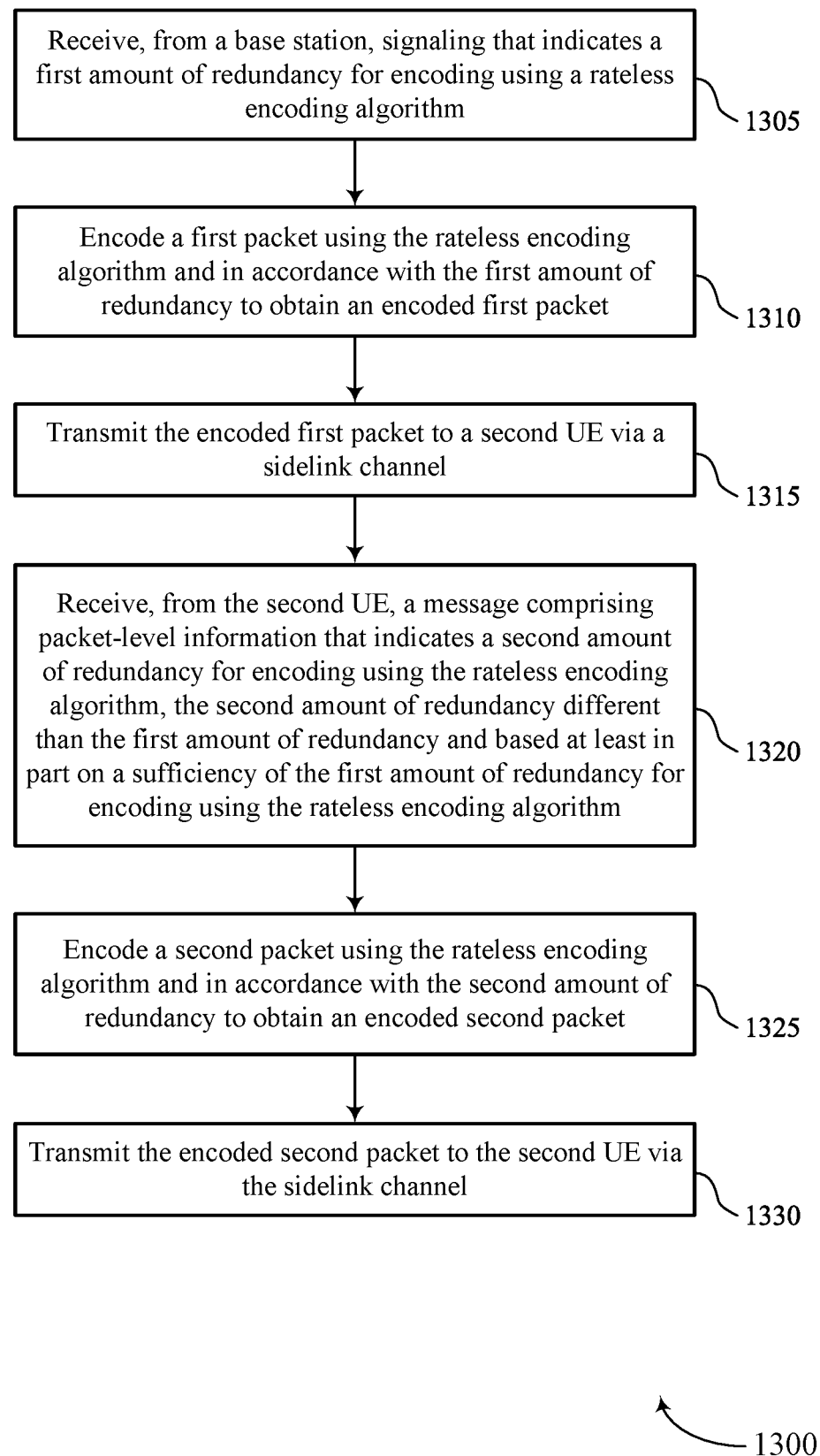

FIG. 13 shows a flowchart illustrating a method 1300 that supports adaptive rateless coding for sidelink communications in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, signaling that indicates a first amount of redundancy for encoding using a rateless encoding algorithm. The operations of 1305 may be performed in accordance with examples as disclosed herein. In some examples, aspects of the operations of 1305 may be performed by a direct link manager 925 as described with reference to FIG. 9. Additionally or alternatively, means for performing 1305 may, but not necessarily, include, for example, antenna 1025, transceiver 1015, communications manager 1020, memory 1030 (including code 1035), processor 1040 and/or bus 1045.

At 1310, the method may include encoding a first packet using the rateless encoding algorithm and in accordance with the first amount of redundancy to obtain an encoded first packet. The operations of 1310 may be performed in accordance with examples as disclosed herein. In some examples, aspects of the operations of 1310 may be performed by a packet encoder 930 as described with reference to FIG. 9. Additionally or alternatively, means for performing 1310 may, but not necessarily, include, for example, antenna 1025, transceiver 1015, communications manager 1020, memory 1030 (including code 1035), processor 1040 and/or bus 1045.

At 1315, the method may include transmitting the encoded first packet to a second UE via a sidelink channel. The operations of 1315 may be performed in accordance with examples as disclosed herein. In some examples, aspects of the operations of 1315 may be performed by a sidelink message transmitter 935 as described with reference to FIG. 9. Additionally or alternatively, means for performing 1315 may, but not necessarily, include, for example, antenna 1025, transceiver 1015, communications manager 1020, memory 1030 (including code 1035), processor 1040 and/or bus 1045.

At 1320, the method may include receiving, from the second UE, a message including packet-level information that indicates a second amount of redundancy for encoding using the rateless encoding algorithm, the second amount of redundancy different than the first amount of redundancy and based at least in part on a sufficiency of the first amount of redundancy for encoding using the rateless encoding algorithm. The operations of 1320 may be performed in accordance with examples as disclosed herein. In some examples, aspects of the operations of 1320 may be performed by a sidelink feedback receiver 940 as described with reference to FIG. 9. Additionally or alternatively, means for performing 1320 may, but not necessarily, include, for example, antenna 1025, transceiver 1015, communications manager 1020, memory 1030 (including code 1035), processor 1040 and/or bus 1045.

At 1325, the method may include encoding a second packet using the rateless encoding algorithm and in accordance with the second amount of redundancy to obtain an encoded second packet. The operations of 1325 may be performed in accordance with examples as disclosed herein. In some examples, aspects of the operations of 1325 may be performed by a packet encoder 930 as described with reference to FIG. 9. Additionally or alternatively, means for performing 1330 may, but not necessarily, include, for example, antenna 1025, transceiver 1015, communications manager 1020, memory 1030 (including code 1035), processor 1040 and/or bus 1045.

At 1330, the method may include transmitting the encoded second packet to the second UE via the sidelink channel. The operations of 1330 may be performed in accordance with examples as disclosed herein. In some examples, aspects of the operations of 1330 may be performed by a sidelink message transmitter 935 as described with reference to FIG. 9. Additionally or alternatively, means for performing 1335 may, but not necessarily, include, for example, antenna 1025, transceiver 1015, communications manager 1020, memory 1030 (including code 1035), processor 1040 and/or bus 1045.

Figure 14:
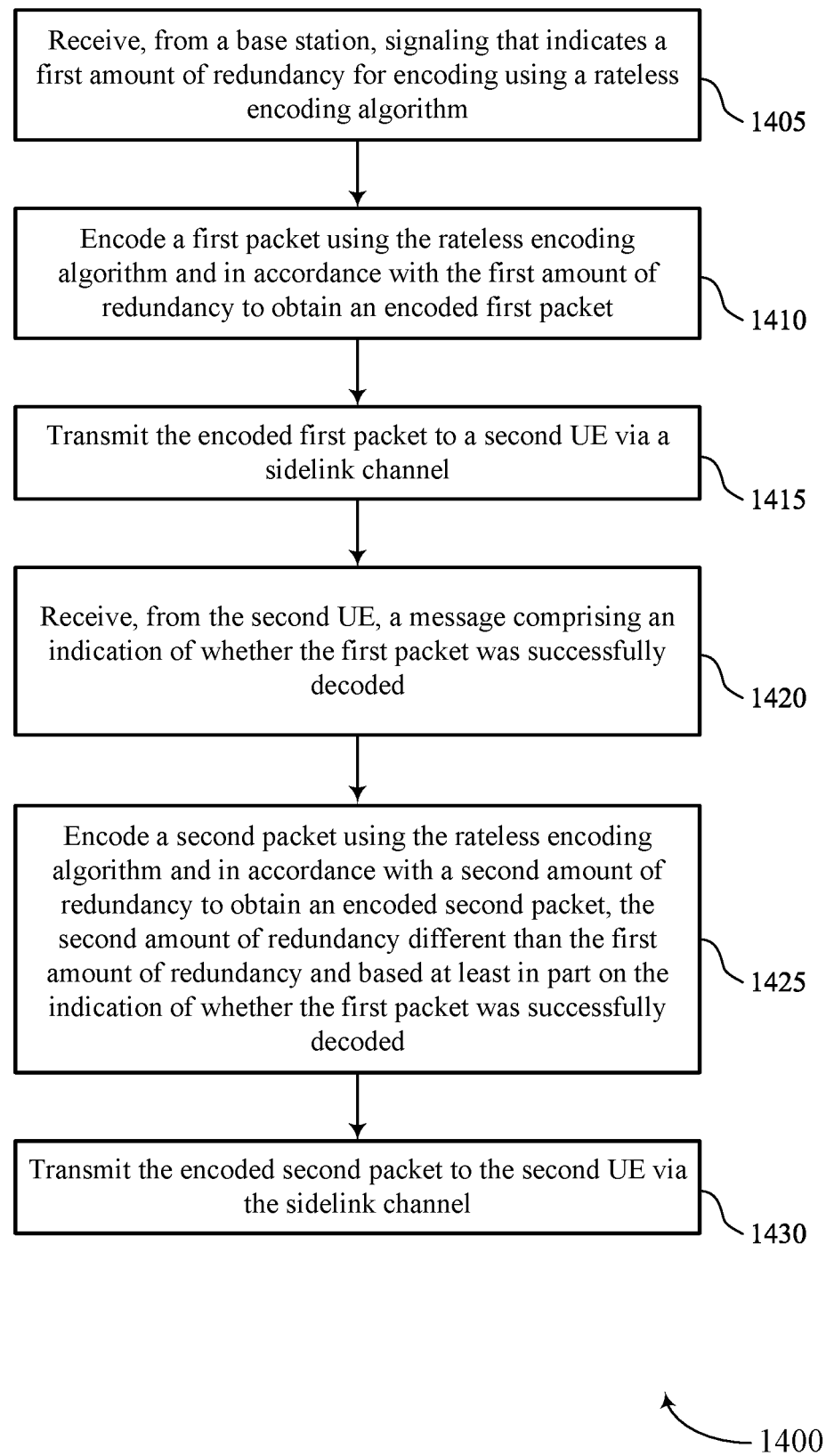

FIG. 14 shows a flowchart illustrating a method 1400 that supports adaptive rateless coding for sidelink communications in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, signaling that indicates a first amount of redundancy for encoding using a rateless encoding algorithm. The operations of 1405 may be performed in accordance with examples as disclosed herein. In some examples, aspects of the operations of 1405 may be performed by a direct link manager 925 as described with reference to FIG. 9. Additionally or alternatively, means for performing 1405 may, but not necessarily, include, for example, antenna 1025, transceiver 1015, communications manager 1020, memory 1030 (including code 1035), processor 1040 and/or bus 1045.

At 1410, the method may include encoding a first packet using the rateless encoding algorithm and in accordance with the first amount of redundancy to obtain an encoded first packet. The operations of 1410 may be performed in accordance with examples as disclosed herein. In some examples, aspects of the operations of 1410 may be performed by a packet encoder 930 as described with reference to FIG. 9. Additionally or alternatively, means for performing 1410 may, but not necessarily, include, for example, antenna 1025, transceiver 1015, communications manager 1020, memory 1030 (including code 1035), processor 1040 and/or bus 1045.

At 1415, the method may include transmitting the encoded first packet to a second UE via a sidelink channel. The operations of 1415 may be performed in accordance with examples as disclosed herein. In some examples, aspects of the operations of 1415 may be performed by a sidelink message transmitter 935 as described with reference to FIG. 9. Additionally or alternatively, means for performing 1415 may, but not necessarily, include, for example, antenna 1025, transceiver 1015, communications manager 1020, memory 1030 (including code 1035), processor 1040 and/or bus 1045.

At 1420, the method may include receiving, from the second UE, a message including an indication of whether the first packet was successfully decoded. The operations of 1420 may be performed in accordance with examples as disclosed herein. In some examples, aspects of the operations of 1420 may be performed by a sidelink feedback receiver 940 as described with reference to FIG. 9. Additionally or alternatively, means for performing 1420 may, but not necessarily, include, for example, antenna 1025, transceiver 1015, communications manager 1020, memory 1030 (including code 1035), processor 1040 and/or bus 1045.

At 1425, the method may include encoding a second packet using the rateless encoding algorithm and in accordance with a second amount of redundancy to obtain an encoded second packet, the second amount of redundancy different than the first amount of redundancy and based on the indication of whether the first packet was successfully decoded. The operations of 1425 may be performed in accordance with examples as disclosed herein. In some examples, aspects of the operations of 1425 may be performed by a packet encoder 930 as described with reference to FIG. 9. Additionally or alternatively, means for performing 1430 may, but not necessarily, include, for example, antenna 1025, transceiver 1015, communications manager 1020, memory 1030 (including code 1035), processor 1040 and/or bus 1045.

At 1435, the method may include transmitting the encoded second packet to the second UE via the sidelink channel. The operations of 1435 may be performed in accordance with examples as disclosed herein. In some examples, aspects of the operations of 1435 may be performed by a sidelink message transmitter 935 as described with reference to FIG. 9. Additionally or alternatively, means for performing 1435 may, but not necessarily, include, for example, antenna 1025, transceiver 1015, communications manager 1020, memory 1030 (including code 1035), processor 1040 and/or bus 1045.

Figure 15:
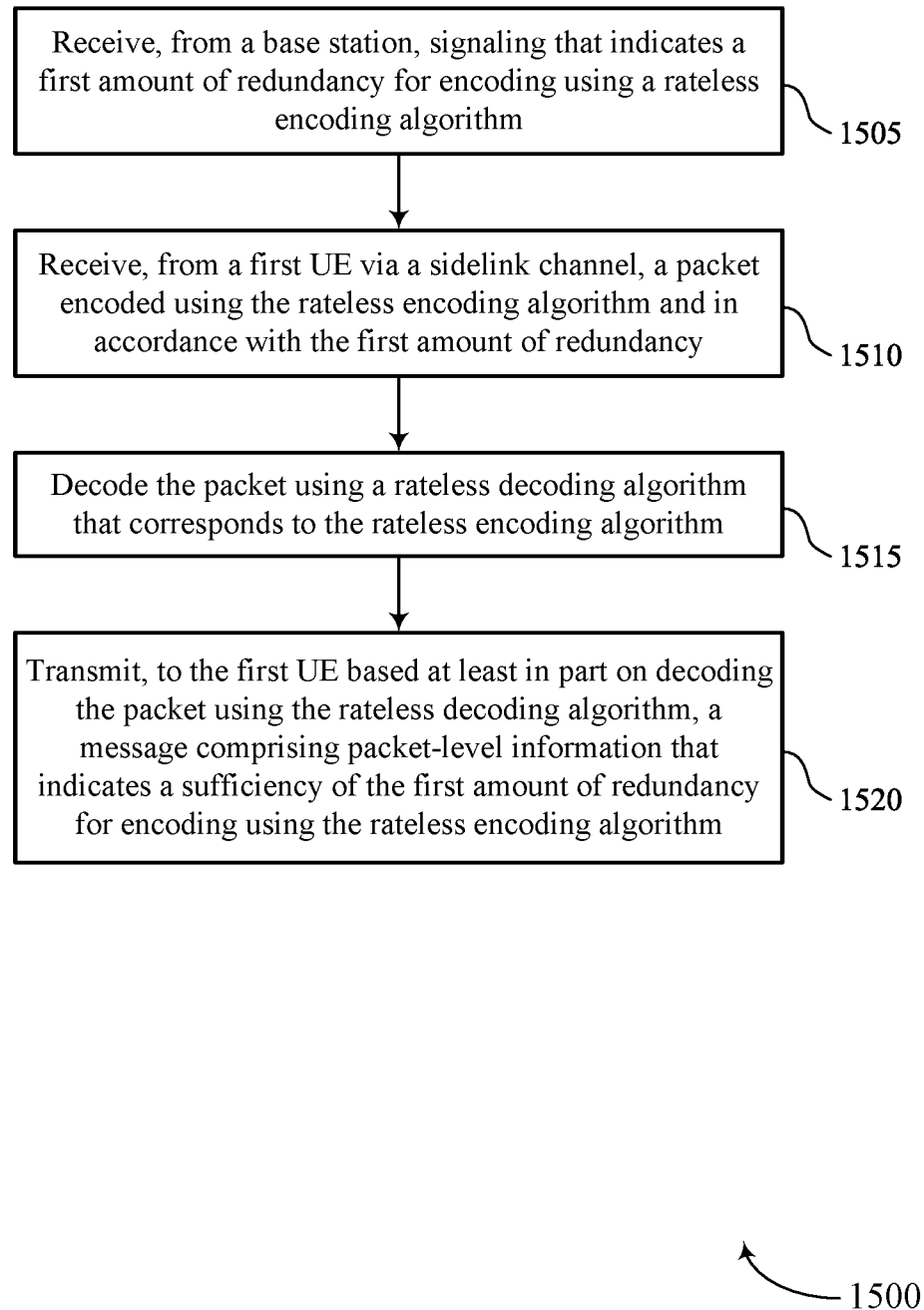

FIG. 15 shows a flowchart illustrating a method 1500 that supports adaptive rateless coding for sidelink communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, signaling that indicates a first amount of redundancy for encoding using a rateless encoding algorithm. The operations of 1505 may be performed in accordance with examples as disclosed herein. In some examples, aspects of the operations of 1505 may be performed by a direct link manager 925 as described with reference to FIG. 9. Additionally or alternatively, means for performing 1505 may, but not necessarily, include, for example, antenna 1025, transceiver 1015, communications manager 1020, memory 1030 (including code 1035), processor 1040 and/or bus 1045.

At 1510, the method may include receiving, from a first UE via a sidelink channel, a packet encoded using the rateless encoding algorithm and in accordance with the first amount of redundancy. The operations of 1510 may be performed in accordance with examples as disclosed herein. In some examples, aspects of the operations of 1510 may be performed by a sidelink message receiver 945 as described with reference to FIG. 9. Additionally or alternatively, means for performing 1510 may, but not necessarily, include, for example, antenna 1025, transceiver 1015, communications manager 1020, memory 1030 (including code 1035), processor 1040 and/or bus 1045.

At 1515, the method may include decoding the packet using a rateless decoding algorithm that corresponds to the rateless encoding algorithm. The operations of 1515 may be performed in accordance with examples as disclosed herein. In some examples, aspects of the operations of 1515 may be performed by a packet decoder 950 as described with reference to FIG. 9. Additionally or alternatively, means for performing 1515 may, but not necessarily, include, for example, antenna 1025, transceiver 1015, communications manager 1020, memory 1030 (including code 1035), processor 1040 and/or bus 1045.

At 1520, the method may include transmitting, to the first UE based on decoding the packet using the rateless decoding algorithm, a message including packet-level information that indicates a sufficiency of the first amount of redundancy for encoding using the rateless encoding algorithm. The message may indicate that the first amount of redundancy is sufficient for encoding using the rateless encoding algorithm, or, alternatively, the message may indicate that the first amount of redundancy is insufficient for encoding using the rateless encoding algorithm, as discussed above. The operations of 1520 may be performed in accordance with examples as disclosed herein. In some examples, aspects of the operations of 1520 may be performed by a sidelink feedback transmitter 955 as described with reference to FIG. 9. Additionally or alternatively, means for performing 1520 may, but not necessarily, include, for example, antenna 1025, transceiver 1015, communications manager 1020, memory 1030 (including code 1035), processor 1040 and/or bus 1045.

Figure 16:
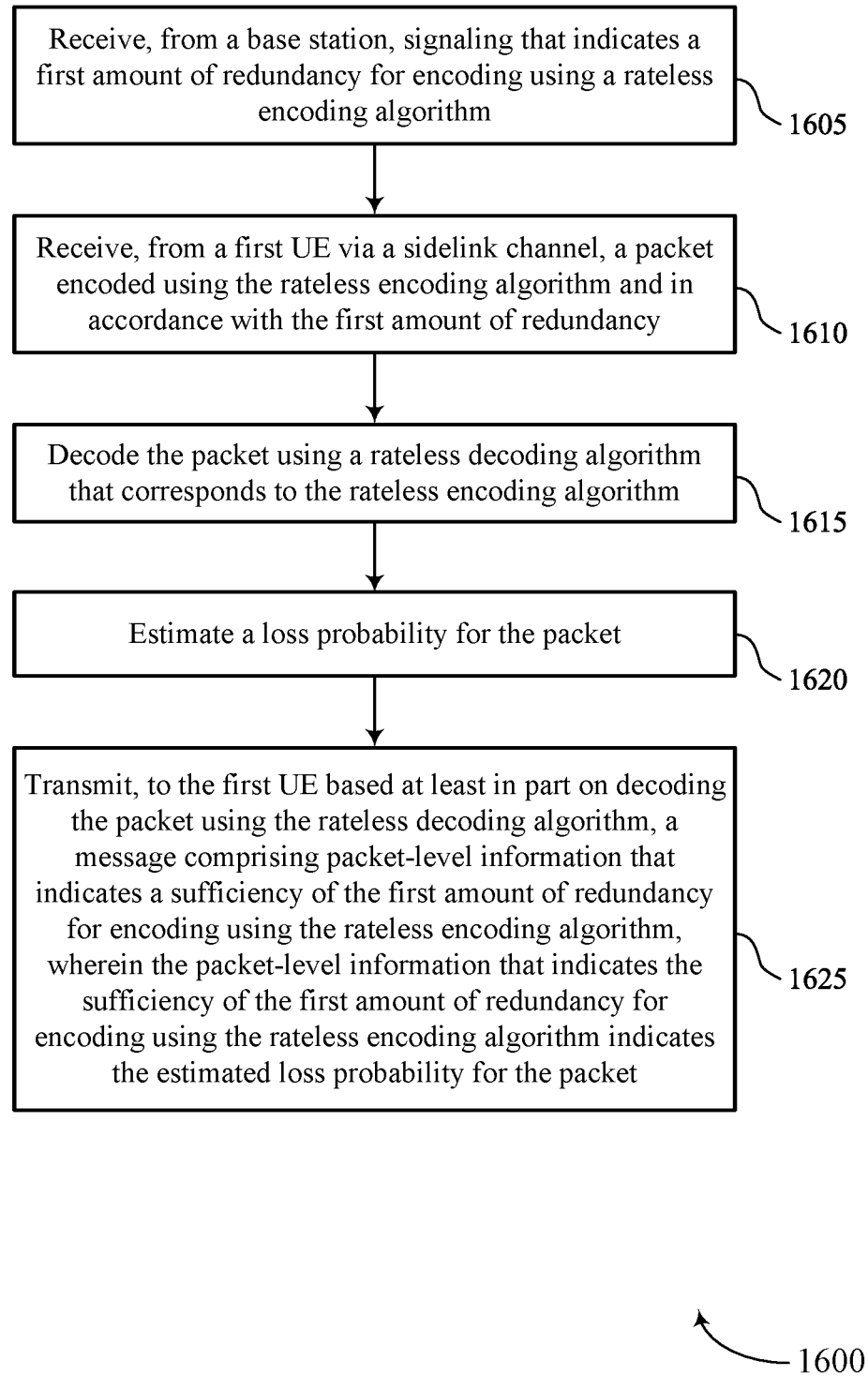

FIG. 16 shows a flowchart illustrating a method 1600 that supports adaptive rateless coding for sidelink communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, signaling that indicates a first amount of redundancy for encoding using a rateless encoding algorithm. The operations of 1605 may be performed in accordance with examples as disclosed herein. In some examples, aspects of the operations of 1605 may be performed by a direct link manager 925 as described with reference to FIG. 9. Additionally or alternatively, means for performing 1605 may, but not necessarily, include, for example, antenna 1025, transceiver 1015, communications manager 1020, memory 1030 (including code 1035), processor 1040 and/or bus 1045.

At 1610, the method may include receiving, from a first UE via a sidelink channel, a packet encoded using the rateless encoding algorithm and in accordance with the first amount of redundancy. The operations of 1610 may be performed in accordance with examples as disclosed herein. In some examples, aspects of the operations of 1610 may be performed by a sidelink message receiver 945 as described with reference to FIG. 9. Additionally or alternatively, means for performing 1610 may, but not necessarily, include, for example, antenna 1025, transceiver 1015, communications manager 1020, memory 1030 (including code 1035), processor 1040 and/or bus 1045.

At 1615, the method may include decoding the packet using a rateless decoding algorithm that corresponds to the rateless encoding algorithm. The operations of 1615 may be performed in accordance with examples as disclosed herein. In some examples, aspects of the operations of 1615 may be performed by a packet decoder 950 as described with reference to FIG. 9. Additionally or alternatively, means for performing 1615 may, but not necessarily, include, for example, antenna 1025, transceiver 1015, communications manager 1020, memory 1030 (including code 1035), processor 1040 and/or bus 1045.

At 1620, the method may include estimating a loss probability for the packet. The operations of 1620 may be performed in accordance with examples as disclosed herein. In some examples, aspects of the operations of 1620 may be performed by a loss probability estimator 965 as described with reference to FIG. 9. Additionally or alternatively, means for performing 1620 may, but not necessarily, include, for example, antenna 1025, transceiver 1015, communications manager 1020, memory 1030 (including code 1035), processor 1040 and/or bus 1045.

At 1625, the method may include transmitting, to the first UE based on decoding the packet using the rateless decoding algorithm, a message including packet-level information that indicates a sufficiency of the first amount of redundancy for encoding using the rateless encoding algorithm, where the packet-level information that indicates the sufficiency of the first amount of redundancy for encoding using the rateless encoding algorithm indicates the estimated loss probability for the packet. The operations of 1625 may be performed in accordance with examples as disclosed herein. In some examples, aspects of the operations of 1625 may be performed by a sidelink feedback transmitter 955 as described with reference to FIG. 9. Additionally or alternatively, means for performing 1625 may, but not necessarily, include, for example, antenna 1025, transceiver 1015, communications manager 1020, memory 1030 (including code 1035), processor 1040 and/or bus 1045.

Figure 17:
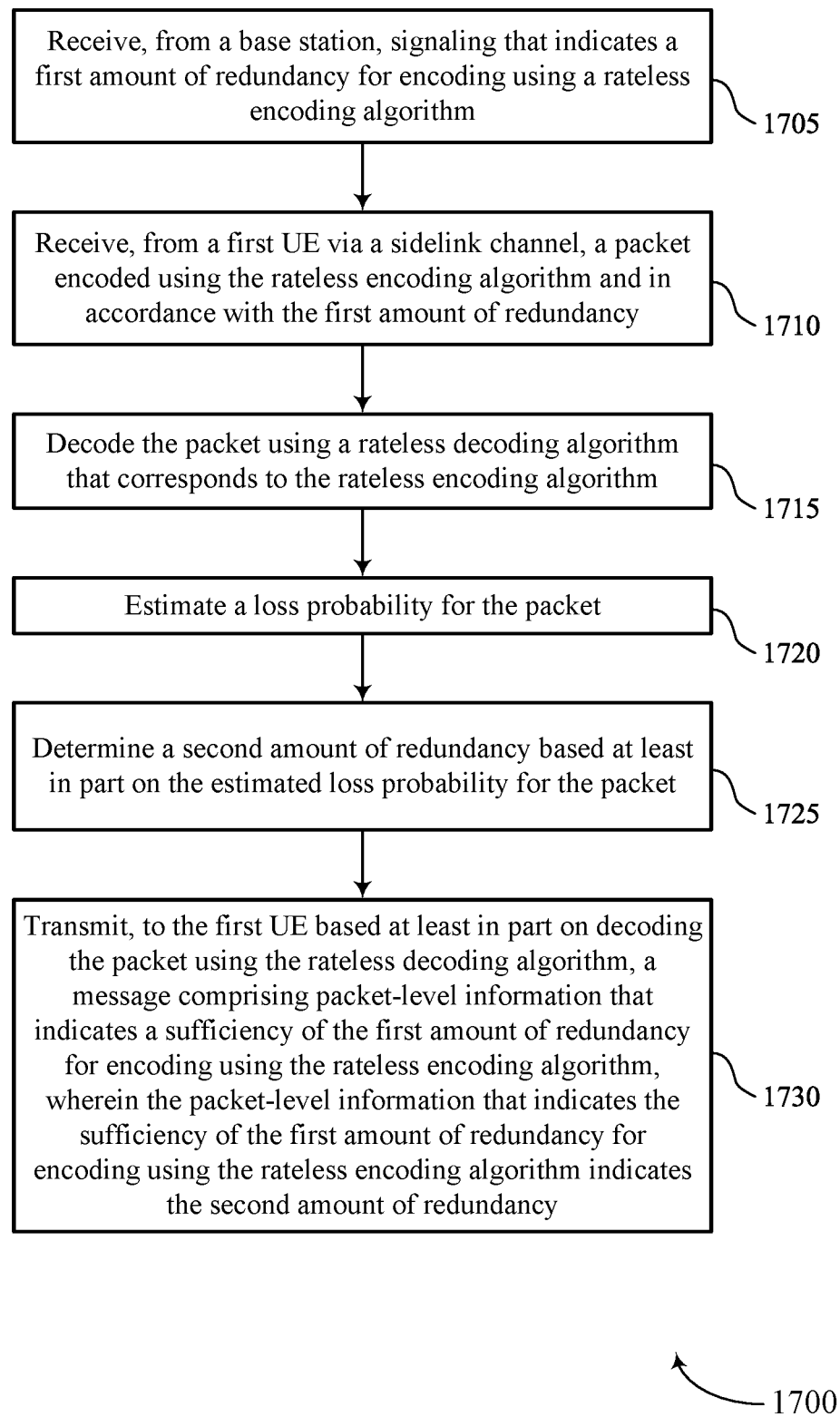

FIG. 17 shows a flowchart illustrating a method 1700 that supports adaptive rateless coding for sidelink communications in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, signaling that indicates a first amount of redundancy for encoding using a rateless encoding algorithm. The operations of 1705 may be performed in accordance with examples as disclosed herein. In some examples, aspects of the operations of 1705 may be performed by a direct link manager 925 as described with reference to FIG. 9. Additionally or alternatively, means for performing 1705 may, but not necessarily, include, for example, antenna 1025, transceiver 1015, communications manager 1020, memory 1030 (including code 1035), processor 1040 and/or bus 1045.

At 1710, the method may include receiving, from a first UE via a sidelink channel, a packet encoded using the rateless encoding algorithm and in accordance with the first amount of redundancy. The operations of 1710 may be performed in accordance with examples as disclosed herein. In some examples, aspects of the operations of 1710 may be performed by a sidelink message receiver 945 as described with reference to FIG. 9. Additionally or alternatively, means for performing 1710 may, but not necessarily, include, for example, antenna 1025, transceiver 1015, communications manager 1020, memory 1030 (including code 1035), processor 1040 and/or bus 1045.

At 1715, the method may include decoding the packet using a rateless decoding algorithm that corresponds to the rateless encoding algorithm. The operations of 1715 may be performed in accordance with examples as disclosed herein. In some examples, aspects of the operations of 1715 may be performed by a packet decoder 950 as described with reference to FIG. 9. Additionally or alternatively, means for performing 1715 may, but not necessarily, include, for example, antenna 1025, transceiver 1015, communications manager 1020, memory 1030 (including code 1035), processor 1040 and/or bus 1045.

At 1720, the method may include estimating a loss probability for the packet. The operations of 1720 may be performed in accordance with examples as disclosed herein. In some examples, aspects of the operations of 1720 may be performed by a loss probability estimator 965 as described with reference to FIG. 9. Additionally or alternatively, means for performing 1720 may, but not necessarily, include, for example, antenna 1025, transceiver 1015, communications manager 1020, memory 1030 (including code 1035), processor 1040 and/or bus 1045.

At 1725, the method may include determining a second amount of redundancy based on the estimated loss probability for the packet. The operations of 1725 may be performed in accordance with examples as disclosed herein. In some examples, aspects of the operations of 1725 may be performed by a redundancy manager 960 as described with reference to FIG. 9. Additionally or alternatively, means for performing 1725 may, but not necessarily, include, for example, antenna 1025, transceiver 1015, communications manager 1020, memory 1030 (including code 1035), processor 1040 and/or bus 1045.

At 1730, the method may include transmitting, to the first UE based on decoding the packet using the rateless decoding algorithm, a message including packet-level information that indicates a sufficiency of the first amount of redundancy for encoding using the rateless encoding algorithm, where the packet-level information that indicates the sufficiency of the first amount of redundancy for encoding using the rateless encoding algorithm indicates the second amount of redundancy. The operations of 1730 may be performed in accordance with examples as disclosed herein. In some examples, aspects of the operations of 1730 may be performed by a sidelink feedback transmitter 955 as described with reference to FIG. 9. Additionally or alternatively, means for performing 1730 may, but not necessarily, include, for example, antenna 1025, transceiver 1015, communications manager 1020, memory 1030 (including code 1035), processor 1040 and/or bus 1045.

Figure 18:
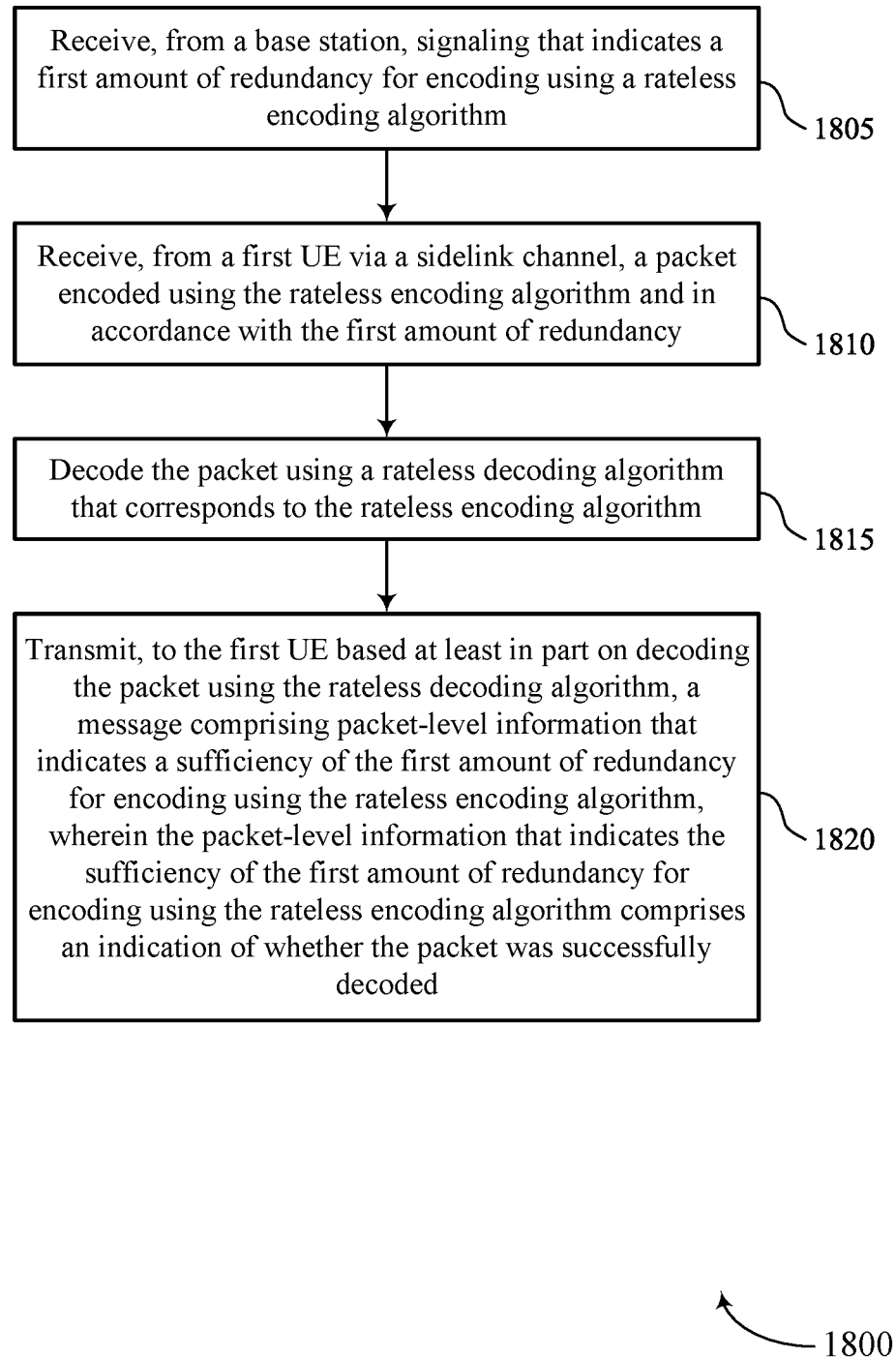

FIG. 18 shows a flowchart illustrating a method 1800 that supports adaptive rateless coding for sidelink communications in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, signaling that indicates a first amount of redundancy for encoding using a rateless encoding algorithm. The operations of 1805 may be performed in accordance with examples as disclosed herein. In some examples, aspects of the operations of 1805 may be performed by a direct link manager 925 as described with reference to FIG. 9. Additionally or alternatively, means for performing 1805 may, but not necessarily, include, for example, antenna 1025, transceiver 1015, communications manager 1020, memory 1030 (including code 1035), processor 1040 and/or bus 1045.

At 1810, the method may include receiving, from a first UE via a sidelink channel, a packet encoded using the rateless encoding algorithm and in accordance with the first amount of redundancy. The operations of 1810 may be performed in accordance with examples as disclosed herein. In some examples, aspects of the operations of 1810 may be performed by a sidelink message receiver 945 as described with reference to FIG. 9. Additionally or alternatively, means for performing 1810 may, but not necessarily, include, for example, antenna 1025, transceiver 1015, communications manager 1020, memory 1030 (including code 1035), processor 1040 and/or bus 1045.

At 1815, the method may include decoding the packet using a rateless decoding algorithm that corresponds to the rateless encoding algorithm. The operations of 1815 may be performed in accordance with examples as disclosed herein. In some examples, aspects of the operations of 1815 may be performed by a packet decoder 950 as described with reference to FIG. 9. Additionally or alternatively, means for performing 1815 may, but not necessarily, include, for example, antenna 1025, transceiver 1015, communications manager 1020, memory 1030 (including code 1035), processor 1040 and/or bus 1045.

At 1820, the method may include transmitting, to the first UE based on decoding the packet using the rateless decoding algorithm, a message including packet-level information that indicates a sufficiency of the first amount of redundancy for encoding using the rateless encoding algorithm, wherein the packet-level information that indicates the sufficiency of the first amount of redundancy for encoding using the rateless encoding algorithm comprises an indication of whether the packet was successfully decoded. The operations of 1820 may be performed in accordance with examples as disclosed herein. In some examples, aspects of the operations of 1820 may be performed by a sidelink feedback transmitter 955 as described with reference to FIG. 9. Additionally or alternatively, means for performing 1820 may, but not necessarily, include, for example, antenna 1025, transceiver 1015, communications manager 1020, memory 1030 (including code 1035), processor 1040 and/or bus 1045.

Figure 19:
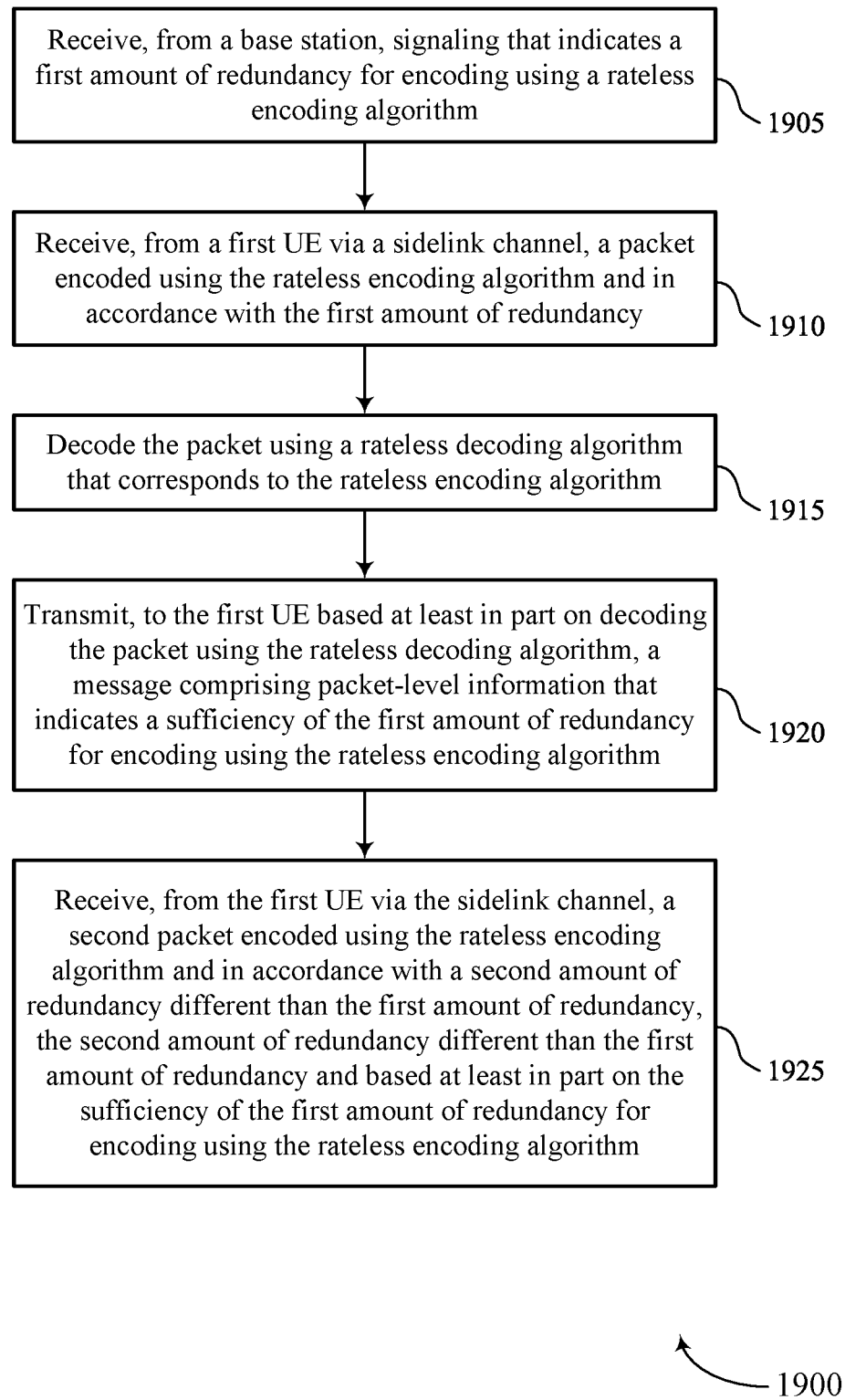

FIG. 19 shows a flowchart illustrating a method 1900 that supports adaptive rateless coding for sidelink communications in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, signaling that indicates a first amount of redundancy for encoding using a rateless encoding algorithm. The operations of 1905 may be performed in accordance with examples as disclosed herein. In some examples, aspects of the operations of 1905 may be performed by a direct link manager 925 as described with reference to FIG. 9. Additionally or alternatively, means for performing 1905 may, but not necessarily, include, for example, antenna 1025, transceiver 1015, communications manager 1020, memory 1030 (including code 1035), processor 1040 and/or bus 1045.

At 1910, the method may include receiving, from a first UE via a sidelink channel, a packet encoded using the rateless encoding algorithm and in accordance with the first amount of redundancy. The operations of 1910 may be performed in accordance with examples as disclosed herein. In some examples, aspects of the operations of 1910 may be performed by a sidelink message receiver 945 as described with reference to FIG. 9. Additionally or alternatively, means for performing 1910 may, but not necessarily, include, for example, antenna 1025, transceiver 1015, communications manager 1020, memory 1030 (including code 1035), processor 1040 and/or bus 1045.

At 1915, the method may include decoding the packet using a rateless decoding algorithm that corresponds to the rateless encoding algorithm. The operations of 1915 may be performed in accordance with examples as disclosed herein. In some examples, aspects of the operations of 1915 may be performed by a packet decoder 950 as described with reference to FIG. 9. Additionally or alternatively, means for performing 1915 may, but not necessarily, include, for example, antenna 1025, transceiver 1015, communications manager 1020, memory 1030 (including code 1035), processor 1040 and/or bus 1045.

At 1920, the method may include transmitting, to the first UE based on decoding the packet using the rateless decoding algorithm, a message including packet-level information that indicates a sufficiency of the first amount of redundancy for encoding using the rateless encoding algorithm. The message may indicate that the first amount of redundancy is sufficient for encoding using the rateless encoding algorithm, or, alternatively, the message may indicate that the first amount of redundancy is insufficient for encoding using the rateless encoding algorithm, as discussed above. The operations of 1920 may be performed in accordance with examples as disclosed herein. In some examples, aspects of the operations of 1920 may be performed by a sidelink feedback transmitter 955 as described with reference to FIG. 9. Additionally or alternatively, means for performing 1920 may, but not necessarily, include, for example, antenna 1025, transceiver 1015, communications manager 1020, memory 1030 (including code 1035), processor 1040 and/or bus 1045.

At 1925, the method may include receiving, from the first UE via the sidelink channel, a second packet encoded using the rateless encoding algorithm and in accordance with a second amount of redundancy different than the first amount of redundancy, the second amount of redundancy different than the first amount of redundancy and based on the sufficiency of the first amount of redundancy for encoding using the rateless encoding algorithm. The operations of 1925 may be performed in accordance with examples as disclosed herein. In some examples, aspects of the operations of 1925 may be performed by a sidelink message receiver 945 as described with reference to FIG. 9. Additionally or alternatively, means for performing 1925 may, but not necessarily, include, for example, antenna 1025, transceiver 1015, communications manager 1020, memory 1030 (including code 1035), processor 1040 and/or bus 1045.

The following provides an overview of aspects of the present disclosure:

Aspect 1: A method for wireless communications at a first UE, comprising: receiving, from a base station, signaling that indicates a first amount of redundancy for encoding using a rateless encoding algorithm; encoding a first packet using the rateless encoding algorithm and in accordance with the first amount of redundancy to obtain an encoded first packet; transmitting the encoded first packet to a second UE via a sidelink channel; receiving, from the second UE, a message comprising information (e.g., packet-level information) that indicates a sufficiency of the first amount of redundancy for encoding using the rateless encoding algorithm; encoding a second packet using the rateless encoding algorithm and in accordance with a second amount of redundancy to obtain an encoded second packet, the second amount of redundancy different than the first amount of redundancy and based at least in part on the sufficiency of the first amount of redundancy for encoding using the rateless encoding algorithm; and transmitting the encoded second packet to the second UE via the sidelink channel.

Aspect 2: The method of aspect 1, wherein the information that indicates the sufficiency of the first amount of redundancy indicates an estimated loss probability for the first packet, the method further comprising: determining the second amount of redundancy based at least in part on the estimated loss probability.

Aspect 3: The method of aspect 2, wherein determining the second amount of redundancy based at least in part on the estimated loss probability comprises: identifying the second amount of redundancy based at least in part on an index value for a lookup table, wherein the index value for the lookup table corresponds to the estimated loss probability.

Aspect 4: The method of any of aspects 1 through 3, wherein receiving the message comprising the information that indicates the sufficiency of the first amount of redundancy comprises: receiving, in the message, an indication of the second amount of redundancy.

Aspect 5: The method of any of aspects 1 through 4, wherein receiving the message comprising the information that indicates the sufficiency of the first amount of redundancy comprises: receiving, in the message, a request to decrease a redundancy amount for encoding using the rateless encoding algorithm, wherein the second amount of redundancy is less than the first amount of redundancy.

Aspect 6: The method of any of aspects 1 through 5, wherein receiving the message comprising the information that indicates the sufficiency of the first amount of redundancy comprises: receiving, in the message, a request to increase a redundancy amount for encoding using the rateless encoding algorithm, wherein the second amount of redundancy is greater than the first amount of redundancy.

Aspect 7: The method of any of aspects 1 through 6, wherein receiving the message comprising the information that indicates the sufficiency of the first amount of redundancy comprises: receiving, in the message, an indication of whether the first packet was successfully decoded, wherein the second amount of redundancy is based at least in part on the indication.

Aspect 8: The method of any of aspects 1 through 7, wherein encoding the first packet using the rateless encoding algorithm comprises: dividing the first packet into a set of subpackets comprising a first quantity of subpackets; and generating a set of encoded subpackets based at least in part on the set of subpackets and using the rateless encoding algorithm, wherein the set of encoded subpackets comprises a second quantity of encoded subpackets that is greater than the first quantity of subpackets, and wherein an amount of redundancy for encoding using the rateless encoding algorithm comprises a difference between the second quantity of encoded subpackets and the first quantity of subpackets.

Aspect 9: The method of any of aspects 1 through 8, further comprising: receiving, from the second UE, a second message comprising information (e.g., packet-level information) that indicates a second sufficiency of the second amount of redundancy for encoding using the rateless encoding algorithm; transmitting, to the base station and based at least in part on the information that indicates the second sufficiency of the second amount of redundancy for encoding using the rateless encoding algorithm, a request to switch from using the rateless encoding algorithm to using a different rateless encoding algorithm for sidelink communications; receiving, from the base station, an indication of a second rateless encoding algorithm that comprises the different rateless encoding algorithm; encoding a third packet using the second rateless encoding algorithm to obtain an encoded third packet; and transmitting the encoded third packet to the second UE via the sidelink channel.

Aspect 10: The method of any of aspects 1 through 9, further comprising: receiving an indication of a quantity of subpackets into which to divide each packet for encoding using the rateless encoding algorithm, an indication of the rateless encoding algorithm, an indication of a rateless decoding algorithm, an indication of a pool of transmission resources for sidelink communications by the first UE, or any combination thereof.

Aspect 11: A method for wireless communications at a second UE, comprising: receiving, from a base station, signaling that indicates a first amount of redundancy for encoding using a rateless encoding algorithm; receiving, from a first UE via a sidelink channel, a packet encoded using the rateless encoding algorithm and in accordance with the first amount of redundancy; decoding the packet using a rateless decoding algorithm that corresponds to the rateless encoding algorithm; and transmitting, to the first UE based at least in part on decoding the packet using the rateless decoding algorithm, a message comprising information (e.g., packet-level information) that indicates a sufficiency of the first amount of redundancy for encoding using the rateless encoding algorithm.

Aspect 12: The method of aspect 11, further comprising: estimating a loss probability for the packet, wherein the information that indicates the sufficiency of the first amount of redundancy for encoding using the rateless encoding algorithm indicates the estimated loss probability for the packet.

Aspect 13: The method of aspect 12, wherein estimating the loss probability for the packet comprises: determining a first quantity of subpackets received by the second UE during a time period and a second quantity of subpackets transmitted by the first UE during the time period, the loss probability based at least in part on a ratio between the first quantity of subpackets received by the second UE and the second quantity of subpackets transmitted by the first UE during the time period.

Aspect 14: The method of any of aspects 11 through 13, further comprising: estimating a loss probability for the packet; and determining a second amount of redundancy based at least in part on the estimated loss probability for the packet, wherein the information that indicates the sufficiency of the first amount of redundancy for encoding using the rateless encoding algorithm indicates the second amount of redundancy.

Aspect 15: The method of aspect 14, wherein determining the second amount of redundancy based at least in part on the estimated loss probability comprises: identifying the second amount of redundancy based at least in part on an index value for a lookup table, wherein the index value for the lookup table corresponds to the estimated loss probability.

Aspect 16: The method of any of aspects 11 through 15, wherein transmitting the message comprising the information that indicates the sufficiency of the first amount of redundancy comprises: transmitting, in the message, a request to increase a redundancy amount.

Aspect 17: The method of any of aspects 11 through 16, wherein transmitting the message comprising the information that indicates the sufficiency of the first amount of redundancy comprises: transmitting, in the message, a request to decrease a redundancy amount.

Aspect 18: The method of any of aspects 11 through 17, wherein transmitting the message comprising the information that indicates the sufficiency of the first amount of redundancy comprises: transmitting, in the message, an indication of whether the packet was successfully decoded.

Aspect 19: The method of any of aspects 11 through 18, wherein decoding the packet using the rateless decoding algorithm comprises: identifying a set of encoded subpackets received for the packet, the set of encoded subpackets comprising a first quantity of encoded subpackets greater than or equal to a second quantity of original subpackets encoded using the rateless encoding algorithm; decoding the set of encoded subpackets to obtain a set of decoded subpackets comprising a third quantity of decoded subpackets, the third quantity greater than or equal to the second quantity; and attempting to obtain the packet based at least in part on the set of decoded subpackets.

Aspect 20: The method of aspect 19, wherein a probability of success for decoding the packet using the rateless decoding algorithm is based at least in part on a difference between the first quantity of encoded subpackets and the second quantity of original subpackets.

Aspect 21: The method of any of aspects 11 through 20, further comprising: transmitting, to the base station, a request to transmit the information that indicates the sufficiency of the first amount of redundancy for encoding using the rateless encoding algorithm; and receiving, from the base station, a grant in response to the request, wherein the message comprising the information that indicates the sufficiency of the first amount of redundancy for encoding using the rateless encoding algorithm is transmitted based at least in part on the grant from the base station.

Aspect 22: The method of aspect 21, wherein transmitting the request to transmit the information that indicates the sufficiency of the first amount of redundancy for encoding using the rateless encoding algorithm is based at least in part on one of a condition of the sidelink channel or a quality of service target associated with the sidelink channel.

Aspect 23: The method of any of aspects 11 through 22, further comprising: receiving, from the base station, a request to transmit the information that indicates the sufficiency of the first amount of redundancy for encoding using the rateless encoding algorithm, wherein transmitting the message comprising the information that indicates the sufficiency of the first amount of redundancy for encoding using the rateless encoding algorithm is transmitted based at least in part on the request from the base station.

Aspect 24: The method of any of aspects 11 through 23, further comprising: receiving, from the first UE via the sidelink channel, a second packet encoded using the rateless encoding algorithm and in accordance with a second amount of redundancy different than the first amount of redundancy, the second amount of redundancy different than the first amount of redundancy and based at least in part on the sufficiency of the first amount of redundancy for encoding using the rateless encoding algorithm.

Aspect 25: The method of any of aspects 11 through 24, further comprising: receiving an indication of a quantity of original subpackets for the packet encoded using the rateless encoding algorithm, an indication of the rateless encoding algorithm, an indication of the rateless decoding algorithm, an indication of a pool of transmission resources for sidelink communications by the second UE, or any combination thereof.

Aspect 26: An apparatus comprising a memory, a transceiver, and at least one processor in communication with the memory and the transceiver, the at least one processor configured to cause the apparatus to perform a method of any of aspects 1 through 10.

Aspect 27: An apparatus for wireless communications at a first UE, comprising at least one means for performing a method of any of aspects 1 through 10.

Aspect 28: A non-transitory computer-readable medium storing code for wireless communications at a first UE, the code comprising instructions executable by a processor to perform a method of any of aspects 1 through 10.

Aspect 29: An apparatus comprising a memory, a transceiver, and at least one processor in communication with the memory and the transceiver, the at least one processor configured to cause the apparatus to perform a method of any of aspects 11 through 25.

Aspect 30: An apparatus for wireless communications at a second UE, comprising at least one means for performing a method of any of aspects 11 through 25.

Aspect 31: A non-transitory computer-readable medium storing code for wireless communications at a second UE, the code comprising instructions executable by a processor to perform a method of any of aspects 11 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving, from a network device, signaling that indicates a first amount of redundancy for encoding using a rateless encoding algorithm;
   encoding a first packet using the rateless encoding algorithm and in accordance with the first amount of redundancy to obtain an encoded first packet, wherein the first amount of redundancy comprises a first difference between a quantity of encoded subpackets of the encoded first packet and a quantity of original subpackets of the first packet;
   transmitting the encoded first packet to a second UE via a sidelink channel;
   receiving, from the second UE, a message comprising packet-level information that indicates a sufficiency of the first amount of redundancy for encoding using the rateless encoding algorithm;
   encoding a second packet using the rateless encoding algorithm and in accordance with a second amount of redundancy to obtain an encoded second packet, the second amount of redundancy different than the first amount of redundancy and based at least in part on the sufficiency of the first amount of redundancy for encoding using the rateless encoding algorithm, wherein the second amount of redundancy comprises a second difference between a quantity of encoded subpackets of the encoded second packet and a quantity of original subpackets of the second packet; and
   transmitting the encoded second packet to the second UE via the sidelink channel.

2. The method of claim 1, wherein receiving the message comprising the packet-level information that indicates the sufficiency of the first amount of redundancy comprises:
   receiving, in the message, an indication of the second amount of redundancy;
   receiving, in the message, a request to decrease a redundancy amount for encoding using the rateless encoding algorithm, wherein the second amount of redundancy is less than the first amount of redundancy;
   receiving, in the message, a request to increase a redundancy amount for encoding using the rateless encoding algorithm, wherein the second amount of redundancy is greater than the first amount of redundancy;
   receiving, in the message, an indication of whether the first packet was successfully decoded, wherein the second amount of redundancy is based at least in part on the indication; or
   any combination thereof.

3. The method of claim 1, wherein receiving the message comprising the packet-level information that indicates the sufficiency of the first amount of redundancy comprises receiving, in the message, an indication of an estimated loss probability for the first packet, the method further comprising:
   determining the second amount of redundancy based at least in part on the estimated loss probability.

4. The method of claim 3, wherein determining the second amount of redundancy based at least in part on the estimated loss probability comprises:
   identifying the second amount of redundancy based at least in part on an index value for a lookup table, wherein the index value for the lookup table corresponds to the estimated loss probability.

5. The method of claim 1, wherein encoding the first packet using the rateless encoding algorithm comprises:
   dividing the first packet into a set of original subpackets comprising the quantity of original subpackets of the first packet; and
   generating a set of encoded subpackets based at least in part on the set of original subpackets and using the rateless encoding algorithm, wherein the set of encoded subpackets comprises the quantity of encoded subpackets of the encoded first packet that is greater than the quantity of original subpackets of the first packet.

6. The method of claim 1, further comprising:
   receiving, from the second UE, a second message comprising packet-level information that indicates a second sufficiency of the second amount of redundancy for encoding using the rateless encoding algorithm;
   transmitting, to the network device and based at least in part on the packet-level information that indicates the second sufficiency of the second amount of redundancy for encoding using the rateless encoding algorithm, a request to switch from using the rateless encoding algorithm to using a different rateless encoding algorithm for sidelink communications;
   receiving, from the network device, an indication of a second rateless encoding algorithm that comprises the different rateless encoding algorithm;
   encoding a third packet using the second rateless encoding algorithm to obtain an encoded third packet; and transmitting the encoded third packet to the second UE via the sidelink channel.

7. The method of claim 1, further comprising:
receiving an indication of the quantity of original subpackets into which to divide each packet for encoding using the rateless encoding algorithm, an indication of the rateless encoding algorithm, an indication of a rateless decoding algorithm, an indication of a pool of transmission resources for sidelink communications by the first UE, or any combination thereof.

8. A method for wireless communications at a second user equipment (UE), comprising:
receiving, from a network device, signaling that indicates a first amount of redundancy for encoding using a rateless encoding algorithm;
receiving, from a first UE via a sidelink channel, a packet encoded using the rateless encoding algorithm and in accordance with the first amount of redundancy;
decoding the packet using a rateless decoding algorithm that corresponds to the rateless encoding algorithm, wherein the first amount of redundancy comprises a difference between a quantity of encoded subpackets of the packet encoded using the rateless encoding algorithm and a quantity of original subpackets of the packet; and
transmitting, to the first UE based at least in part on decoding the packet using the rateless decoding algorithm, a message comprising packet-level information that indicates a sufficiency of the first amount of redundancy for encoding using the rateless encoding algorithm.

9. The method of claim 8, further comprising:
estimating a loss probability for the packet, wherein the packet-level information that indicates the sufficiency of the first amount of redundancy for encoding using the rateless encoding algorithm indicates the estimated loss probability for the packet.

10. The method of claim 9, wherein estimating the loss probability for the packet comprises:
determining a first quantity of subpackets received by the second UE during a time period and a second quantity of subpackets transmitted by the first UE during the time period, the loss probability based at least in part on a ratio between the first quantity of subpackets received by the second UE and the second quantity of subpackets transmitted by the first UE during the time period.

11. The method of claim 8, further comprising:
estimating a loss probability for the packet; and
determining a second amount of redundancy based at least in part on the estimated loss probability for the packet, wherein the packet-level information that indicates the sufficiency of the first amount of redundancy for encoding using the rateless encoding algorithm indicates the second amount of redundancy.

12. The method of claim 11, wherein determining the second amount of redundancy based at least in part on the estimated loss probability comprises:
identifying the second amount of redundancy based at least in part on an index value for a lookup table, wherein the index value for the lookup table corresponds to the estimated loss probability.

13. The method of claim 8, wherein transmitting the message comprising the packet-level information that indicates the sufficiency of the first amount of redundancy comprises:
transmitting, in the message, a request to increase a redundancy amount;
transmitting, in the message, a request to decrease a redundancy amount;
transmitting, in the message, an indication of whether the packet was successfully decoded; or
any combination thereof.

14. The method of claim 8, wherein decoding the packet using the rateless decoding algorithm comprises:
identifying a set of encoded subpackets received for the packet;
decoding the set of encoded subpackets received for the packet to obtain a set of decoded subpackets comprising a quantity of decoded subpackets, the quantity of decoded subpackets greater than or equal to the quantity of original subpackets; and
attempting to obtain the packet based at least in part on the set of decoded subpackets, wherein a probability of success for decoding the packet using the rateless decoding algorithm is based at least in part on a difference between the quantity of encoded subpackets received for the packet and the quantity of original subpackets.

15. The method of claim 8, further comprising:
transmitting, to the network device and based at least in part on at least one of a condition of the sidelink channel or a quality of service target associated with the sidelink channel, a request to transmit the packet-level information that indicates the sufficiency of the first amount of redundancy for encoding using the rateless encoding algorithm; and
receiving, from the network device, a grant in response to the request, wherein the message comprising the packet-level information that indicates the sufficiency of the first amount of redundancy for encoding using the rateless encoding algorithm is transmitted based at least in part on the grant from the network device.

16. The method of claim 8, further comprising:
receiving, from the network device, a request to transmit the packet-level information that indicates the sufficiency of the first amount of redundancy for encoding using the rateless encoding algorithm, wherein transmitting the message comprising the packet-level information that indicates the sufficiency of the first amount of redundancy for encoding using the rateless encoding algorithm is transmitted based at least in part on the request from the network device.

17. The method of claim 8, further comprising:
receiving, from the first UE via the sidelink channel, a second packet encoded using the rateless encoding algorithm and in accordance with a second amount of redundancy different than the first amount of redundancy, the second amount of redundancy different than the first amount of redundancy and based at least in part on the sufficiency of the first amount of redundancy for encoding using the rateless encoding algorithm.

18. The method of claim 8, further comprising:
receiving an indication of the quantity of original subpackets for the packet encoded using the rateless encoding algorithm, an indication of the rateless encoding algorithm, an indication of the rateless decoding algorithm, an indication of a pool of transmission resources for sidelink communications by the second UE, or any combination thereof.

19. An apparatus for wireless communications, comprising:
a memory;
a transceiver; and at least one processor of a first user equipment (UE), the at least one processor in communication with the memory and the transceiver, and the at least one processor configured to cause the apparatus to:
- receive, from a base station network device via the transceiver, signaling that indicates a first amount of redundancy for encoding using a rateless encoding algorithm;
- encode a first packet using the rateless encoding algorithm and in accordance with the first amount of redundancy to obtain an encoded first packet, wherein the first amount of redundancy comprises a first difference between a quantity of encoded subpackets of the encoded first packet and a quantity of original subpackets of the first packet;
- transmit, via the transceiver, the encoded first packet to a second UE via a sidelink channel;
- receive, from the second UE via the transceiver, a message comprising packet-level information that indicates a sufficiency of the first amount of redundancy for encoding using the rateless encoding algorithm;
- encode a second packet using the rateless encoding algorithm and in accordance with a second amount of redundancy to obtain an encoded second packet, the second amount of redundancy different than the first amount of redundancy and based at least in part on the sufficiency of the first amount of redundancy for encoding using the rateless encoding algorithm, wherein the second amount of redundancy comprises a second difference between a quantity of encoded subpackets of the encoded second packet and a quantity of original subpackets of the second packet; and
- transmit, via the transceiver, the encoded second packet to the second UE via the sidelink channel.

20. The apparatus of claim 19, wherein, to receive the message comprising the packet-level information that indicates the sufficiency of the first amount of redundancy, the at least one processor is configured to cause the apparatus to:
- receive, in the message, an indication of the second amount of redundancy;
- receive, in the message, a request to decrease a redundancy amount for encoding using the rateless encoding algorithm, wherein the second amount of redundancy is less than the first amount of redundancy;
- receive, in the message, a request to increase a redundancy amount for encoding using the rateless encoding algorithm, wherein the second amount of redundancy is greater than the first amount of redundancy;
- receive, in the message, an indication of whether the first packet was successfully decoded, wherein the second amount of redundancy is based at least in part on the indication; or
- any combination thereof.

21. The apparatus of claim 19, wherein:
- to receive the message comprising the packet-level information that indicates the sufficiency of the first amount of redundancy, the at least one processor is configured to cause the apparatus to receive, in the message, an indication of an estimated loss probability for the first packet; and
- the at least one processor is further configured to cause the apparatus to determine the second amount of redundancy based at least in part on the estimated loss probability.

22. The apparatus of claim 21, wherein, to determine the second amount of redundancy based at least in part on the estimated loss probability, the at least one processor is configured to cause the apparatus to:
- identify the second amount of redundancy based at least in part on an index value for a lookup table, wherein the index value for the lookup table corresponds to the estimated loss probability.

23. The apparatus of claim 19, the at least one processor further configured to cause the apparatus to:
- receive, from the second UE via the transceiver, a second message comprising packet-level information that indicates a second sufficiency of the second amount of redundancy for encoding using the rateless encoding algorithm;
- transmit, to the network device via the transceiver and based at least in part on the packet-level information that indicates the second sufficiency of the second amount of redundancy for encoding using the rateless encoding algorithm, a request to switch from using the rateless encoding algorithm to using a different rateless encoding algorithm for sidelink communications;
- receive, from the network device via the transceiver, an indication of a second rateless encoding algorithm that comprises the different rateless encoding algorithm;
- encode a third packet using the second rateless encoding algorithm to obtain an encoded third packet; and
- transmit, to the second UE via the transceiver, the encoded third packet via the sidelink channel.

24. The apparatus of claim 19, the at least one processor further configured to cause the apparatus to:
- receive, via the transceiver, an indication of the quantity of original subpackets into which to divide each packet for encoding using the rateless encoding algorithm, an indication of the rateless encoding algorithm, an indication of a rateless decoding algorithm, an indication of a pool of transmission resources for sidelink communications by the first UE, or any combination thereof.

25. An apparatus for wireless communications, comprising:
- a memory;
- a transceiver; and
- at least one processor of a second user equipment (UE), the at least one processor in communication with the memory and the transceiver, and the at least one processor configured to cause the apparatus to:
  - receive, from a network device via the transceiver, signaling that indicates a first amount of redundancy for encoding using a rateless encoding algorithm;
  - receive, from a first UE via the transceiver and a sidelink channel, a packet encoded using the rateless encoding algorithm and in accordance with the first amount of redundancy;
  - decode the packet using a rateless decoding algorithm that corresponds to the rateless encoding algorithm, wherein the first amount of redundancy comprises a difference between a quantity of encoded subpackets of the packet encoded using the rateless encoding algorithm and a quantity of original subpackets of the packet; and
  - transmit, to the first UE via the transceiver and based at least in part on decoding the packet using the rateless decoding algorithm, a message comprising packet-level information that indicates a sufficiency of the first amount of redundancy for encoding using the rateless encoding algorithm.

26. The apparatus of claim 25, the at least one processor further configured to cause the apparatus to:
estimate a loss probability for the packet, wherein the packet-level information that indicates the sufficiency of the first amount of redundancy for encoding using the rateless encoding algorithm indicates the estimated loss probability for the packet.

27. The apparatus of claim 26, wherein, to estimate the loss probability for the packet, the at least one processor is configured to cause the apparatus to:
determine a first quantity of subpackets received by the second UE during a time period and a second quantity of subpackets transmitted by the first UE during the time period, the loss probability based at least in part on a ratio between the first quantity of subpackets received by the second UE and the second quantity of subpackets transmitted by the first UE during the time period.

28. The apparatus of claim 25, the at least one processor further configured to cause the apparatus to:
estimate a loss probability for the packet; and
determine a second amount of redundancy based at least in part on the estimated loss probability for the packet, wherein the packet-level information that indicates the sufficiency of the first amount of redundancy for encoding using the rateless encoding algorithm indicates the second amount of redundancy.

29. The apparatus of claim 28, wherein, to determine the second amount of redundancy based at least in part on the estimated loss probability, the at least one processor is configured to cause the apparatus to:
identify the second amount of redundancy based at least in part on an index value for a lookup table, wherein the index value for the lookup table corresponds to the estimated loss probability.

30. The apparatus of claim 25, wherein, to transmit the message comprising the packet-level information that indicates the sufficiency of the first amount of redundancy, the at least one processor is configured to cause the apparatus to:
transmit, in the message, a request to increase a redundancy amount;
transmit, in the message, a request to decrease a redundancy amount;
transmit, in the message, an indication of whether the packet was successfully decoded; or
any combination thereof.

* * * * *